United States Patent
Maeda et al.

(10) Patent No.: US 9,619,347 B2
(45) Date of Patent: Apr. 11, 2017

(54) SYSTEMS AND METHODS OF FAULT MANAGEMENT IN ELECTRONIC COMMUNICATIONS

(71) Applicant: FUJITSU LIMITED, Kawasaki-shi, Kanagawa (JP)

(72) Inventors: Masahiro Maeda, Zama (JP); Tomohiro Inoue, Kawasaki (JP); Shinya Hiramoto, Yokohama (JP); Shun Ando, Yokohama (JP); Koji Hosoe, Yamato (JP); Yuichiro Ajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 107 days.

(21) Appl. No.: 14/629,881

(22) Filed: Feb. 24, 2015

(65) Prior Publication Data
US 2015/0278043 A1 Oct. 1, 2015

(30) Foreign Application Priority Data
Mar. 28, 2014 (JP) .................................. 2014-069111

(51) Int. Cl.
G06F 11/00 (2006.01)
G06F 11/20 (2006.01)
(Continued)

(52) U.S. Cl.
CPC ...... G06F 11/2007 (2013.01); G06F 13/4282 (2013.01); H04L 1/20 (2013.01);
(Continued)

(58) Field of Classification Search
CPC .................................................. G06F 11/2007
See application file for complete search history.

(56) References Cited

U.S. PATENT DOCUMENTS

| 5,526,399 A | 6/1996 | Kameda |
| 2010/0083066 A1 | 4/2010 | Sivaramakrishnan et al. |

(Continued)

FOREIGN PATENT DOCUMENTS

| EP | 2 672 642 A2 | 12/2013 |
| JP | 2006-186527 | 7/2006 |
| WO | 2013/145240 A1 | 10/2013 |

OTHER PUBLICATIONS

Extended European Search Report dated Aug. 4, 2015 in corresponding European Patent Application No. 15156826.8.
(Continued)

*Primary Examiner* — Michael Maskulinski
(74) *Attorney, Agent, or Firm* — Staas & Halsey LLP

(57) ABSTRACT

An apparatus includes: a physical-layer device that distributes data to first lanes and performs data transfer to/from an external device by second lanes each of which has a number of the first lanes; and a transfer circuit that transfers data output by a central-processing unit performing arithmetic-processing to the physical-layer device and transfers the data received from the physical-layer device and received by the central-processing unit, the transfer circuit that comprises an information-acquisition unit that receives one of detection information of the first lanes which indicates that the physical-layer device has received data from the external device and error information of the first lanes which indicates that the data transferred to the physical-layer device from the external device has an error, from the physical-layer device, and a selection unit configured to specify the second lane to be degenerated based on one of the error information and the detection information.

15 Claims, 13 Drawing Sheets

(51) Int. Cl.
*G06F 13/42* (2006.01)
*H04Q 11/00* (2006.01)
*H04L 1/20* (2006.01)

(52) U.S. Cl.
CPC ..... *H04Q 11/0066* (2013.01); *G06F 2201/85* (2013.01); *H04Q 2011/0081* (2013.01)

(56) References Cited

U.S. PATENT DOCUMENTS

| | | | |
|---|---|---|---|
| 2010/0162033 A1* | 6/2010 | Ahn | G06F 11/2007 714/4.1 |
| 2012/0144230 A1 | 6/2012 | Buckland et al. | |
| 2013/0235735 A1* | 9/2013 | Anantharam | H04L 43/0817 370/250 |
| 2014/0078894 A1 | 3/2014 | Han et al. | |
| 2015/0012774 A1* | 1/2015 | Maeda | G06F 11/0724 714/5.1 |
| 2015/0163014 A1* | 6/2015 | Birrittella | H04L 1/0045 714/807 |

OTHER PUBLICATIONS

Kanbe et al., "Lane Degeneration Technology for 100 Gbit Ethernet", IEICE Technical Report, CS2010-39, pp. 13-18, Nov. 2010.

\* cited by examiner

FIG. 6

| NO. | LINK-UP STATE | TRIGGER OF LANE DEGENERATION |
|---|---|---|
| 1 | BEFORE LINK-UP OF RHY | DETECTION OF LANE FAILURE |
| 2 | AFTER LINK-UP OF RHY | DETERIORATION IN BIT ERROR LATE (THE NUMBER OF RETRANSMISSIONS WITHIN UNIT TIME EXCEEDS THRESHOLD VALUE) |
| 3 | | DETECTION OF RETRY OUT (THE NUMBER OF CONSECUTIVE RETRANSMISSIONS EXCEEDS THRESHOLD VALUE, TIME-OUT OF RECEPTION OF ACK/NACK) |
| 4 | | DETECTION OF FLOW CONTROL PROTOCOL ERROR (PERIOD FOR WHICH FLOW CONTROL FRAME IS NOT RECEIVED EXCEEDS THRESHOLD VALUE) |
| 5 | | THE NUMBER OF BIP ERRORS WITHIN PREDETERMINED PERIOD OF TIME EXCEEDS THRESHOLD VALUE |

FIG. 8

| PCS LANE | DETECTION/NON-DETECTION OF ALIGNMENT MARKER | PHYSICAL LANE | THE NUMBER OF PCS LANES IN WHICH ALIGNMENT MARKER IS DETECTED | RESULT OF SPECIFICATION |
|---|---|---|---|---|
| PLr0 | DETECTED | PHLr0 | 5 | NORMAL |
| PLr1 | DETECTED | | | |
| PLr2 | DETECTED | | | |
| PLr3 | DETECTED | | | |
| PLr4 | DETECTED | | | |
| PLr5 ⋯ PLr9 | DETECTED ⋯ DETECTED | PHLr1 | 5 | NORMAL |
| PLr10 ⋯ PLr14 | DETECTED ⋯ DETECTED | PHLr2 | 5 | NORMAL |
| PLr15 | DETECTED | PHLr3 | 4 | DEGENERATION TARGET |
| PLr16 | UNDETECTED | | | |
| PLr17 | DETECTED | | | |
| PLr18 | DETECTED | | | |
| PLr19 | DETECTED | | | |

FIG. 9

| PCS LANE | BIP ERROR | PHYSICAL LANE | THE NUMBER OF BIP ERRORS IN PREDETERMINED PERIOD OF TIME (THRESHOLD VALUE: 3) | RESULT OF SPECIFICATION |
|---|---|---|---|---|
| PLr0 | PRESENT | PHLr0 | 4 | DEGENERATION TARGET |
| PLr1 | ABSENT | | | |
| PLr2 | ABSENT | | | |
| PLr3 | ABSENT | | | |
| PLr4 | ABSENT | | | |
| PLr5 | ABSENT | PHLr1 | 1 | NORMAL |
| PLr9 | ABSENT | | | |
| PLr10 | ABSENT | PHLr2 | 2 | NORMAL |
| PLr14 | ABSENT | | | |
| PLr15 | ABSENT | PHLr3 | 0 | NORMAL |
| PLr16 | ABSENT | | | |
| PLr17 | ABSENT | | | |
| PLr18 | ABSENT | | | |
| PLr19 | ABSENT | | | |

SYSTEMS AND METHODS OF FAULT MANAGEMENT IN ELECTRONIC COMMUNICATIONS

CROSS-REFERENCE TO RELATED APPLICATION

This application is based upon and claims the benefit of priority of the prior Japanese Patent Application No. 2014-069111, filed on Mar. 28, 2014, the entire contents of which are incorporated herein by reference.

FIELD

The embodiments discussed herein are related to an information processing apparatus, a parallel computer system, and a method of controlling the parallel computer system.

BACKGROUND

A parallel computer system includes, for example, a plurality of information processing apparatuses (hereinafter, also referred to as nodes) which process data. The plurality of information processing apparatuses of the parallel computer system are connected to each other through a transmission path (hereinafter, also referred to as a lane). For example, the information processing apparatus using the Ethernet (trademark) of 100 Gbps which is standardized in the IEEE802.3ba standard transfers data to an information processing apparatus which is a communication destination by using a plurality of lanes. Hereinafter, the Ethernet of 100 Gbps is also referred to as 100 Gb Ethernet. For example, in the 100 Gb Ethernet, a link is realized by the plurality of lanes.

For example, when optical transmission is applied to a link in which nodes of the parallel computer system are connected to each other by the plurality of lanes, an optical module including a light emitting element which converts an electrical signal into an optical signal, a light receiving element which converts an optical signal into an electrical signal, and the like is used. A failure rate of the optical module such as a light emitting element is higher than that of an electrical component. For example, when one of the plurality of lanes has a defect due to the failure of the optical module, or the like, the link between the nodes is cut. In this case, it is not possible to perform processing such as parallel computation using a node including a defective component (for example, a defective optical module). Thus, the reliability of the parallel computer system decreases in association with an increase in the failure rate of the lane.

In other words, if the connection of the link is maintained by realizing degeneration of a defect lane (hereinafter, also referred to as a defective lane), the reliability of the parallel computer system is improved. A physical layer (hereinafter, also referred to as a physical layer PHY) of the IEEE802.3ba standard is not provided with a function of specifying a defective lane and a function of realizing lane degeneration.

Accordingly, a physical layer architecture capable of maintaining a link by avoiding a failure occurring in some lanes is proposed (for example, Akihiro Kanbe, Masashi Kono, Hidehiro Toyoda, "Lane Degeneration Technology for 100 Gbit Ethernet", *IEICE technical report*, CS2010-39, pp. 13-18, November 2010). For example, in order to realize lane degeneration, a function of embedding lane switching control information in an alignment marker insertion and extraction protocol of 100 Gb Ethernet standard specification is added. Failure of each lane is detected by monitoring, for example, a header of 2 bits of a 64B/66B code block.

In addition, as a method of specifying a transmission path in a failure state from a plurality of transmission paths, a method is proposed of generating a fixed data pattern for specifying a lane in which a failure occurs and of transmitting the generated fixed data pattern to an apparatus which is a connection destination (for example, Japanese Laid-open Patent Publication No. 2006-186527). For example, the apparatus having received the fixed data pattern specifies a transmission path in a failure state from the received fixed data pattern.

In an information processing apparatus assuming use of a physical layer based on the IEEE802.3ba standard, a physical layer that does not have a function of specifying a defective lane is used, and thus it is difficult to specify a defective lane. In a method of adding a function of embedding lane switching control information in an alignment marker insertion and extraction protocol, and the like, a physical layer protocol is improved, and thus there is a concern that the amount of changes from the physical layer of the IEEE802.3ba standard may increase. When the amount of changes from the standard specification increases, there is a concern that versatility may be decreased.

In one aspect, an information processing apparatus, a parallel computer system, and a method of controlling the parallel computer system of the present disclosure specify a degenerating lane even when a physical layer that does not have a function of specifying a defective lane is used.

SUMMARY

According to an aspect of the invention, an information processing apparatus, comprising: a physical layer device configured to distribute data to a plurality of first lanes and to perform data transfer to and from an external device by using a plurality of second lanes each of which has a number of the first lanes; and a transfer circuit configured to transfer data output by a central processing unit performing arithmetic processing to the physical layer device and to transfer the data which is received from the physical layer device and which is received by the central processing unit, the transfer circuit that comprises: an information acquisition unit configured to receive one of detection information of the first lanes which indicates that the physical layer device has received data from the external device and error information of the first lanes which indicates that the data transferred to the physical layer device from the external device has an error, from the physical layer device, and a selection unit configured to specify the second lane to be degenerated based on one of the error information and the detection information when a failure occurs in one of the plurality of first lanes and the plurality of second lanes, and selects the second lane to be used for data transfer to and from the external device, from the second lanes except for the specified second lane.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a trigger of lane degeneration;

FIG. 8 is a diagram illustrating an example of a method of specifying a degenerating lane;

FIG. 9 is a diagram illustrating another example of a method of specifying a degenerating lane;

DESCRIPTION OF EMBODIMENTS

Hereinafter, an embodiment will be described with reference to the accompanying drawings.

Figure 1:
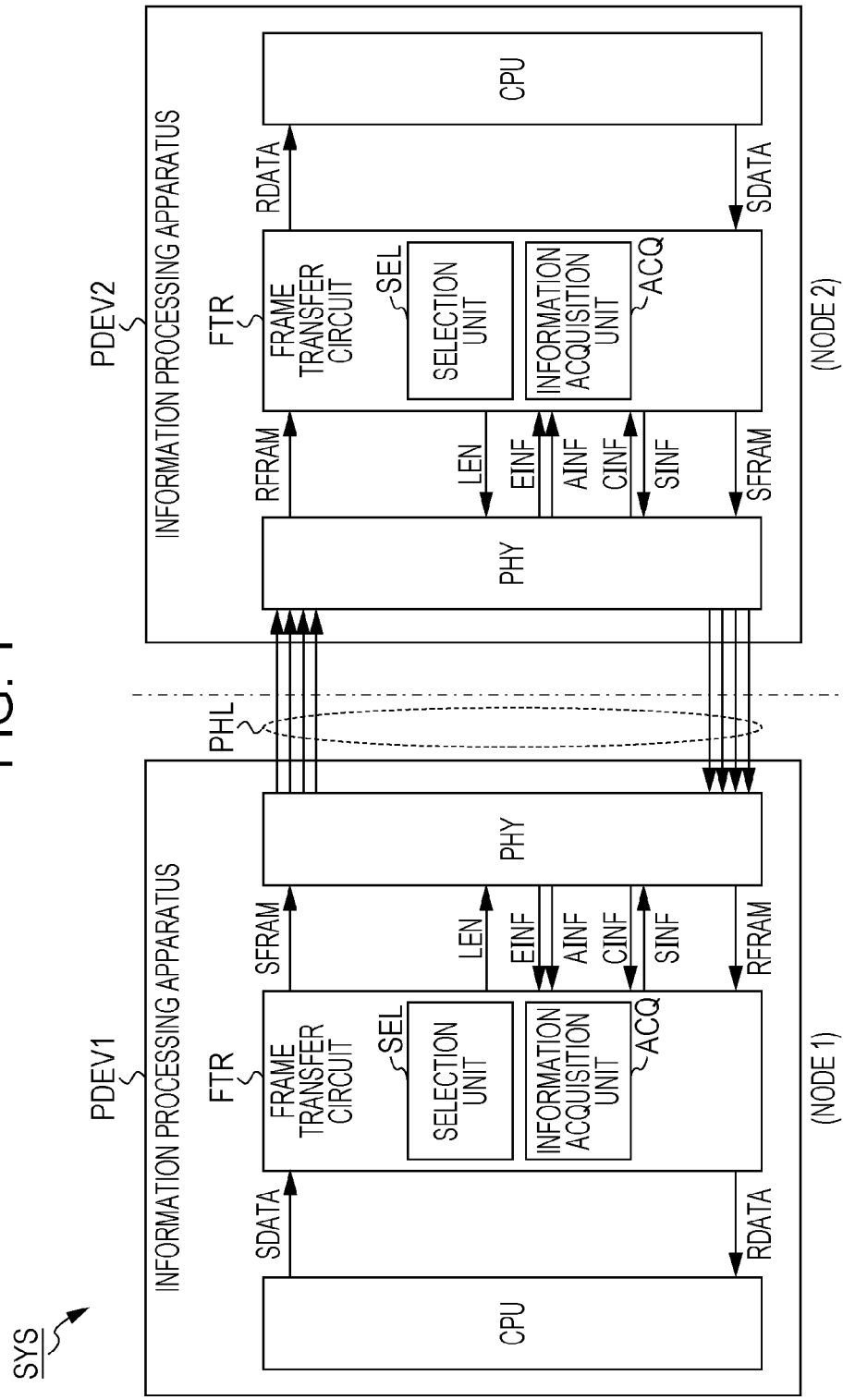
FIG. 1 is a diagram illustrating an embodiment of an information processing apparatus, a parallel computer system, and a method of controlling the parallel computer system.

FIG. 1 illustrates an embodiment of an information processing apparatus, a parallel computer system, and a method of controlling the parallel computer system. A parallel computer system SYS of this embodiment includes a plurality of information processing apparatuses PDEV (PDEV1 and PDEV2) which are connected to each other through a transmission path PHL (hereinafter, also referred to as a physical lane PHL). For example, the information processing apparatus PDEV transfers data to an information processing apparatus PDEV which is a communication destination by using a plurality of physical lanes PHL. Thus, the parallel computer system SYS realizes high-speed transmission between the information processing apparatuses PDEV.

For example, when seen from the information processing apparatus PDEV1, the information processing apparatus PDEV2 is an information processing apparatus PDEV which is a communication destination, and corresponds to an external device. In addition, for example, when seen from the information processing apparatus PDEV2, the information processing apparatus PDEV1 is an information processing apparatus PDEV which is a communication destination, and corresponds to an external device.

The information processing apparatuses PDEV correspond to nodes of the parallel computer system SYS. Hereinafter, the information processing apparatus PDEV will be also referred to as a node. For example, optical transmission is applied to a link that connects the nodes of the parallel computer system SYS. Electrical transmission may be used for the link that connects the nodes of the parallel computer system SYS. The information processing apparatus PDEV includes, for example, a physical layer PHY, a frame transfer circuit FTR, and a central processing unit (CPU).

The physical layer PHY is an example of a physical layer device on which a physical layer of an OSI reference model is mounted. For example, the physical layer PHY has a function based on a Layer 1 (physical layer) of the IEEE802.3ba standard. For example, the physical layer PHY distributes data to a plurality of PCS lanes corresponding to a transmission path within a physical coding sublayer (PCS) included in the physical layer. In addition, the physical layer PHY performs data transfer to and from an external device (for example, the information processing apparatus PDEV which is a communication destination) by using the plurality of physical lanes PHL each of which has a predetermined number of PCS lanes.

For example, the physical layer PHY receives an instruction notification SINF for instructing giving instructions of the start and stop thereof and an enable signal LEN indicating a valid physical lane PHL from the frame transfer circuit FTR. For example, when the physical layer PHY receives the instruction notification SINF for instructing the start thereof from the frame transfer circuit FTR, the physical layer performs start processing such as linking-up with the physical layer PHY of the information processing apparatus PDEV which is a communication destination. When the start thereof is completed, the physical layer PHY outputs a start completion notification CINF indicating the completion of the start thereof to the frame transfer circuit FTR. In addition, for example, when the physical layer PHY receives the instruction notification SINF for instructing the physical layer to stop from the frame transfer circuit FTR, the physical layer performs stop processing for stopping the physical layer PHY.

Further, the physical layer PHY outputs alignment marker detection information AINF of each PCS lane and error information EINF of each PCS lane to the frame transfer circuit FTR. Hereinafter, the alignment marker detection information will be also referred to as alignment marker (AM) detection information. For example, the alignment marker is information indicating the correspondence to the PCS lane of the information processing apparatus PDEV which is a communication destination.

In addition, the AM detection information AINF is an example of detection information of each PCS lane which indicates that the physical layer PHY has received data from an external device (for example, the information processing apparatus PDEV which is a communication destination). In addition, the error information EINF is an example of error information of each PCS lane which indicates that data received by the physical layer PHY from an external device has an error.

For example, the physical layer PHY detects an alignment marker from data transferred to the PCS lanes of the physical layer PHY from the information processing apparatus PDEV which is a communication destination. The physical layer PHY outputs the AM detection information AINF of each PCS lane which indicates that the alignment marker is detected, to the frame transfer circuit FTR.

In addition, for example, the physical layer PHY performs code error detection using bit interleaved parity (BIP) on data transferred to the PCS lanes of the physical layer PHY from the information processing apparatus PDEV which is a communication destination. The physical layer PHY outputs the error information EINF of the PCS lanes indicating results of the code error detection, to the frame transfer circuit FTR.

The frame transfer circuit FTR is an example of a transfer circuit that transfers data to the CPU or the physical layer PHY. For example, the frame transfer circuit FTR is a device on which a layer (for example, a data link layer) which is higher than the physical layer is mounted. For example, the frame transfer circuit FTR generates frame data SFRAM including data SDATA received from the CPU and transfers the generated frame data SFRAM to the physical layer PHY. In addition, the frame transfer circuit FTR transfers, for example, data RDATA included in frame data RFRAM which is received from the physical layer PHY, to the CPU.

Figure 3:
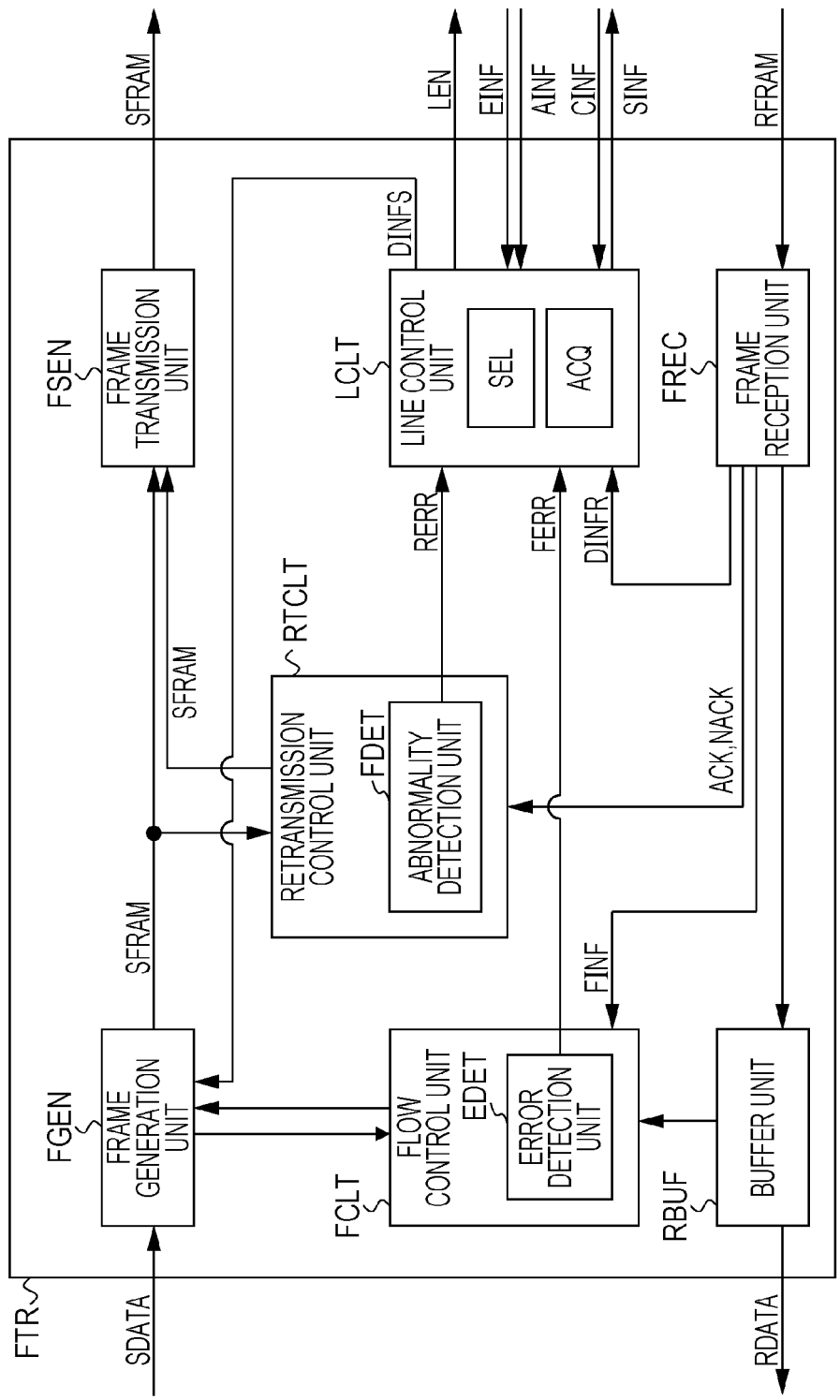
FIG. 3 is a diagram illustrating an example of a frame transfer circuit illustrated in FIG. 1.

In this manner, the frame transfer circuit FTR transfers the data received from the CPU to the physical layer PHY, and transfers the data received from the physical layer PHY to the CPU. Further, the frame transfer circuit FTR includes an information acquisition unit ACQ and a selection unit SEL. For example, as illustrated in FIG. 3 and the like, the frame transfer circuit FTR includes a link control unit LCLT that includes an information acquisition unit ACQ and a selection unit SEL. The information acquisition unit ACQ is an example of an information acquisition unit that receives one of the AM detection information AINF and the error information EINF from the physical layer PHY.

For example, the information acquisition unit ACQ receives the AM detection information AINF indicating that an alignment marker, representing the correspondence to the PCS lane of the information processing apparatus PDEV which is a communication destination, is detected from the physical layer PHY for each PCS lane. In addition, for example, the information acquisition unit ACQ receives the error information EINF, indicating a result of code error detection for data transferred to the physical layer PHY from the information processing apparatus PDEV which is a communication destination, from the physical layer PHY for each PCS lane.

The selection unit SEL is an example of a selection unit that specifies the physical lane PHL to be degenerated, based on one of the AM detection information AINF and the error information EINF. For example, the physical lane PHL to be degenerated is a physical lane PHL that uses a faulty PCS lane, a faulty physical lane PHL, and the like. Hereinafter, the physical lane PHL to be degenerated will be also referred to as a defective lane PHL or a degenerating lane PHL.

For example, when a failure occurs in one of the PCS lane and the physical lane PHL before linking up the physical layer PHY, the selection unit SEL specifies a physical lane PHL to be degenerated (degenerating lane PHL) based on the AM detection information AINF. The selection unit SEL selects a physical lane PHL to be used for data transfer to and from the information processing apparatus PDEV which is a communication destination, from physical lanes PHL except for the specified physical lane PHL (degenerating lane PHL).

In addition, for example, when a failure occurs in one of the PCS lane and the physical lane PHL after linking up the physical layer PHY, the selection unit SEL specifies a physical lane PHL to be degenerated (degenerating lane PHL) based on the error information EINF. The selection unit SEL selects a physical lane PHL to be used for data transfer to and from the information processing apparatus PDEV which is a communication destination, from the physical lanes PHL except for the specified physical lane PHL (degenerating lane PHL).

The CPU includes an example of an arithmetic processing apparatus that executes arithmetic processing. For example, the CPU receives data RDATA from the frame transfer circuit FTR. The CPU executes an arithmetic operation using the data RDATA. In addition, the CPU outputs data SDATA corresponding to, for example, an arithmetic operation result to the frame transfer circuit FTR.

As described above, in the information processing apparatus PDEV, the frame transfer circuit FTR on which a layer higher than a physical layer is mounted specifies the degenerating lane PHL. Thus, in this embodiment, it is possible to specify a degenerating lane PHL even when the physical layer PHY that does not have a function of specifying a defective lane (hereinafter, also referred to as a defective lane specification function) is used. As a result, in this embodiment, it is possible to degenerate a defective lane PHL by setting the specified physical lane PHL (degenerating lane PHL) so as not to be used even when the physical layer PHY that does not have a defective lane specification function is used.

Therefore, the parallel computer system SYS may maintain a link by degenerating the defective lane PHL even when, for example, one of the plurality of physical lanes PHL has a defect. Accordingly, the parallel computer system SYS may execute processing such as parallel computation using a node (information processing apparatus PDEV) which includes the defective lane PHL. In this manner, the reliability of the parallel computer system SYS is improved as compared with a configuration in which a link between nodes is cut when one of the plurality of physical lanes PHL has a defect.

The configurations of the information processing apparatus PDEV and the parallel computer system SYS are not limited to the above-mentioned examples. For example, the information processing apparatus PDEV may include a plurality of sets each of which includes the physical layer PHY and the frame transfer circuit FTR with respect to one CPU. In addition, for example, the parallel computer system SYS may include three or more information processing apparatuses PDEV.

Figure 2:
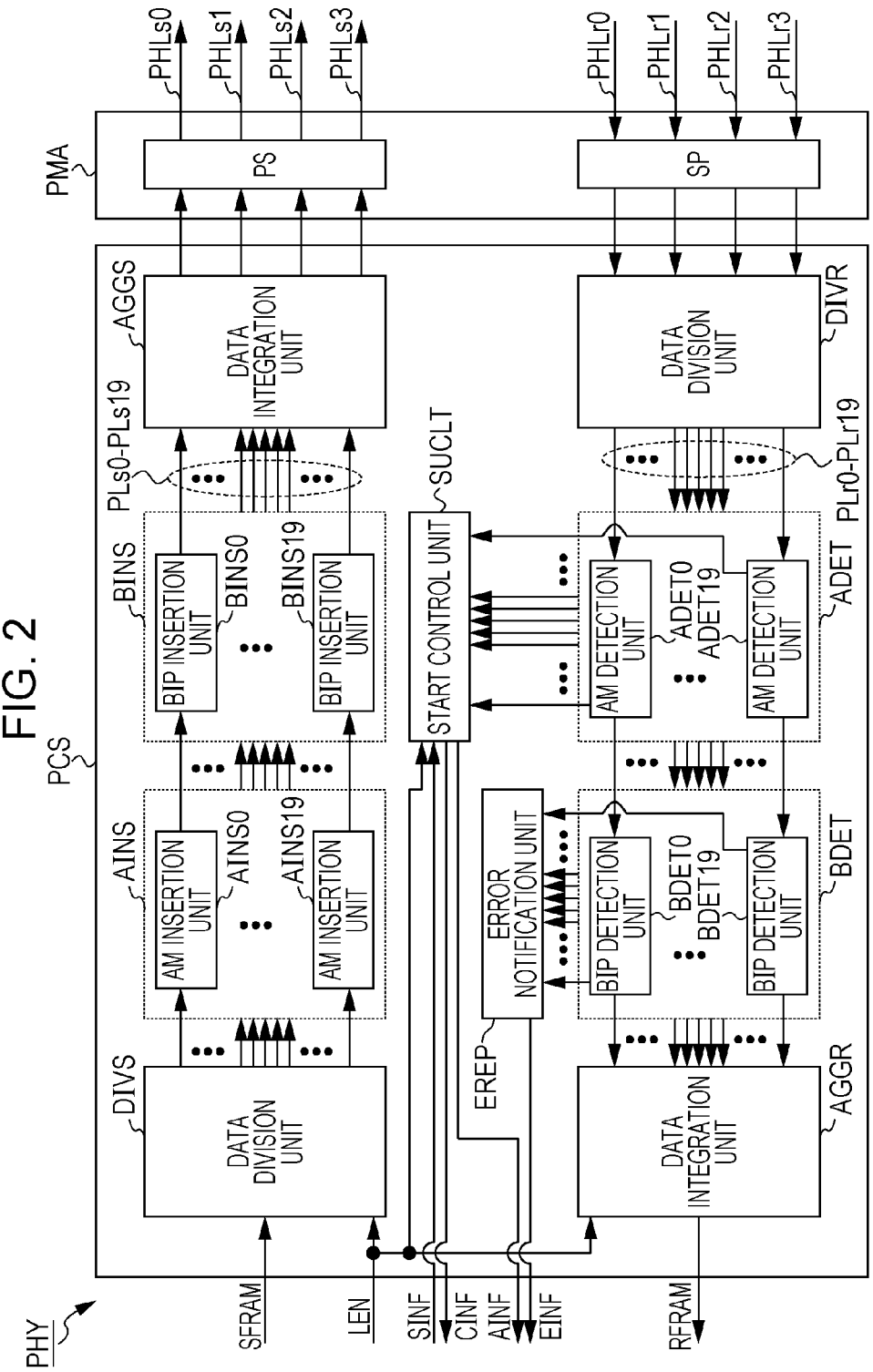
FIG. 2 is a diagram illustrating an example of a physical layer illustrated in FIG. 1.

FIG. 2 illustrates an example of the physical layer PHY illustrated in FIG. 1. In the example of FIG. 2, PCS lanes PLs0 to PLs4 are integrated into a physical lane PHLs0, and PCS lanes PLr0 to PLr4 are integrated into a physical lane PHLr0. PCS lanes PLs5 to PLs9 are integrated into a physical lane PHLs1, and PCS lanes PLr5 to PLr9 are integrated into a physical lane PHLr1. PCS lanes PLs10 to PLs14 are integrated into a physical lane PHLs2, and PCS lanes PLr10 to PLr14 are integrated into a physical lane PHLr2. PCS lanes PLs15 to PLs19 are integrated into a physical lane PHLs3, and PCS lanes PLr15 to PLr19 are integrated into a physical lane PHLr3.

The physical layer PHY includes, for example, a PCS and a physical medium attachment (PMA). The PCS includes, for example, data division units DIVS and DIVR, an AM insertion unit AINS, a BIP insertion unit BINS, data integration units AGGS and AGGR, an AM detection unit ADET, a BIP detection unit BDET, an error notification unit EREP, and a start control unit SUCLT. In addition, the PMA includes a parallel serial conversion unit PS and a serial parallel conversion unit SP.

The data division unit DIVS receives an enable signal LEN indicating valid physical lanes PHL (PHLs and PHLr) from the frame transfer circuit FTR. Thus, for example, the data division unit DIVS may select valid PCS lanes PLs from the plurality of PCS lanes PLs (PLs0 to PLs19). For example, the valid PCS lane PLs is a PCS lane PLs corresponding to a physical lane PHLs which is instructed to be valid by the enable signal LEN.

In addition, the data division unit DIVS sequentially receives frame data SFRAM from the frame transfer circuit FTR. The data division unit DIVS distributes the received frame data SFRAM to the valid PCS lanes PLs and outputs the frame data to the AM insertion unit AINS. For example, the data division unit DIVS performs 64B/66B encoding for encoding data of 64 bits into data of 66 bits.

The data division unit DIVS sorts data into the valid PCS lanes PLs in units of a block after the 64B/66B encoding. Thus, the data in units of a block (block of 66 bits) is transferred to the AM insertion units AINS corresponding to the valid PCS lanes PLs. In this manner, for example, the data division unit DIVS divides one lane into twenty PCS lanes PLs.

For example, the AM insertion units AINS (AINS0 to AINS19) are provided corresponding to the PCS lanes PLs0 to PLs19. Each of the AM insertion units AINS inserts an alignment marker into data received from the data division unit DIVS. The data inserted into the alignment marker is output to the BIP insertion units BINS (BINS0 to BINS19). For example, each of the AM insertion units AINS inserts an alignment marker for every 16384 blocks.

For example, the BIP insertion units BINS (BINS0 to BINS19) are provided corresponding to the PCS lanes PLs0 to PLs19. Each of the BIP insertion units BINS inserts BIP into the data received from the AM insertion units AINS, and outputs the inserted BIP to the data integration unit AGGS. For example, each of the BIP insertion units BINS inserts BIP for every 16384 blocks.

The data integration unit AGGS integrates data received from the BIP insertion units BINS through the PCS lanes PLs and outputs the integrated data to the parallel serial conversion unit PS of the PMA. For example, the data integration unit AGGS integrates twenty PCS lanes PLs into four lanes.

For example, the parallel serial conversion unit PS of the PMA converts data received in parallel from the data integration unit AGGS into serial data. For example, when a bus width of each lane that connects the data integration unit AGGS and the parallel serial conversion unit PS is 32 bits, the parallel serial conversion unit PS converts parallel data of 32 bits into serial data of 1 bit. The parallel serial conversion unit PS transfers the converted serial data to the physical layer PHY of the information processing apparatus PDEV which is a communication destination, through the physical lanes PHLs0 to PHLs4.

The serial parallel conversion unit SP of the PMA receives serial data from the physical layer PHY of the information processing apparatus PDEV which is a communication destination, for example, through the physical lanes PHLr0 to PHLr4. The serial parallel conversion unit SP converts the serial data into parallel data and outputs the converted parallel data to the data division unit DIVR of the PCS. For example, when a bus width of each lane that connects the serial parallel conversion unit SP and the data division unit DIVR is 32 bits, the serial parallel conversion unit SP converts serial data of 1 bit into parallel data of 32 bits.

The data division unit DIVR sequentially receives data from the serial parallel conversion unit SP of the PMA. The data division unit DIVR distributes the received data into the plurality of PCS lanes PLr (PLr0 to PLr19) and outputs the distributed data to the AM detection units ADET (ADET0 to ADET19). In this manner, for example, the data division unit DIVR distributes four lanes into twenty PCS lanes PLr.

For example, the AM detection units ADET (ADET0 to ADET19) are provided corresponding to the PCS lanes PLr0 to PLr19. Each of the AM detection units ADET detects an alignment marker from data transferred from the data division unit DIVR. When one of the AM detection units ADET detects an alignment marker, the AM detection unit outputs the AM detection information AINF indicating that the alignment marker is detected, to the start control unit SUCLT. In addition, the AM detection units ADET output data transferred from the data division unit DIVR, to the BIP detection units BDET (BDET0 to BDET19).

For example, the BIP detection units BDET (BDET0 to BDET19) are provided corresponding to the PCS lanes PLr0 to PLr19. The BIP detection units BDET perform code error detection using BIP on data transferred from the AM detection units ADET. The BIP detection units BDET output results of the code error detection to the error notification unit EREP as the error information EINF. In addition, the BIP detection units BDET output data transferred from the AM detection units ADET to the data integration unit AGGR.

The data integration unit AGGR receives an enable signal LEN indicating the valid physical lanes PHL (PHLs and PHLr) from the frame transfer circuit FTR. Thus, for example, the data integration unit AGGR may select valid PCS lanes PLr from the plurality of PCS lanes PLr (PLr0 to PLr19). For example, the valid PCS lane PLr is a PCS lane PLr corresponding to a physical lane PHLr which is instructed to be valid by the enable signal LEN.

In addition, for example, the data integration unit AGGR integrates twenty PCS lanes PLr into one lane. For example, the data integration unit AGGR decodes data having been subjected to 64B/66B encoding for each valid PCS lane PLr. The data integration unit AGGR integrates data (decoded data) of the PCS lanes PLs to thereby generate frame data RFRAM.

In this manner, the data integration unit AGGR integrates data received from the BIP detection units BDET corresponding to the valid PCS lanes PLr to thereby generate frame data RFRAM. The data integration unit AGGR outputs the frame data RFRAM to the frame transfer circuit FTR.

For example, the start control unit SUCLT receives an instruction notification SINF and an enable signal LEN indicating an instruction for the start and stop thereof from the frame transfer circuit FTR. For example, when the start control unit SUCLT receives the instruction notification SINF indicating the start instruction from the frame transfer circuit FTR, the start control unit performs processing of starting the physical layer PHY. For example, when an alignment marker is detected in all the valid PCS lanes PLr, the start control unit SUCLT outputs the start completion notification CINF indicating the completion of the start of the physical layer, to the frame transfer circuit FTR.

In addition, the start control unit SUCLT outputs the pieces of AM detection information AINF of the PCS lanes PLr which are received from the AM detection units ADET to the information acquisition unit ACQ of the frame transfer circuit FTR. For example, the start control unit SUCLT includes a register that holds the AM detection information AINF received from the AM detection units ADET.

The error notification unit EREP outputs the pieces of error information EINF of the PCS lanes PLr which are received from the BIP detection units BDET to the information acquisition unit ACQ of the frame transfer circuit FTR. For example, the error notification unit EREP includes a register that holds the error information EINF received from the BIP detection units BDET. In this manner, the physical layer PHY outputs the AM detection information AINF and the error information EINF to the frame transfer circuit FTR. Thus, the frame transfer circuit FTR may detect failures of the physical lane PHL and the like, and may specify a degenerating lane PHL.

The configuration of the physical layer PHY is not limited to the above-mentioned example. For example, the AM detection units ADET may output the AM detection information AINF to the start control unit SUCLT and the information acquisition unit ACQ of the frame transfer circuit FTR. In addition, for example, the BIP detection units BDET may output the error information EINF to the error notification unit EREP and the information acquisition unit ACQ of the frame transfer circuit FTR. In addition, the number of PCS lanes PL (PLs and PLr), the number of physical lanes PHL (PHLs and PHLr), and the like are not limited to the above-mentioned examples.

FIG. 3 illustrates an example of the frame transfer circuit FTR illustrated in FIG. 1. The frame transfer circuit FTR includes a frame generation unit FGEN, a frame transmission unit FSEN, a retransmission control unit RTCLT, a frame reception unit FREC, a buffer unit RBUF, a flow control unit FCLT, and a link control unit LCLT. The information acquisition unit ACQ and the selection unit SEL which are illustrated in FIG. 1 are included in, for example, the link control unit LCLT.

The frame generation unit FGEN receives the data SDATA from the CPU, and converts the received data SDATA into a frame format. Thus, frame data SFRAM is generated. The frame generation unit FGEN outputs the frame data SFRAM converted into a frame format to the frame transmission unit FSEN and the retransmission control unit RTCLT. In addition, for example, the frame generation unit FGEN outputs information indicating a data length of the frame data SFRAM to the flow control unit FCLT.

The frame transmission unit FSEN is an interface circuit for transmitting the frame data SFRAM to the physical layer PHY. For example, the frame transmission unit FSEN performs the transfer of an asynchronous clock to and from the physical layer PHY. In addition, the frame transmission unit FSEN has a data path selection function of selecting one of the frame data SFRAM received from the retransmission control unit RTCLT and the frame data SFRAM received from the frame generation unit FGEN as output data.

The retransmission control unit RTCLT stores the frame data SFRAM received from the frame generation unit FGEN in a buffer or the like provided therein. In addition, for example, the retransmission control unit RTCLT receives a positive acknowledgement signal ACK, a negative acknowledgement signal NACK, and the like from the frame reception unit FREC. For example, the positive acknowledgement signal ACK is a signal indicating that the reception of data has been completed normally in the information processing apparatus PDEV which is a communication destination, and is transmitted from the frame transfer circuit FTR of the information processing apparatus PDEV which is a communication destination. In addition, for example, the negative acknowledgement signal NACK is a signal indicating that the information processing apparatus PDEV which is a communication destination may not receive data normally, and is transmitted from the frame transfer circuit FTR of the information processing apparatus PDEV which is a communication destination.

For example, when the retransmission control unit RTCLT receives the negative acknowledgement signal NACK, the retransmission control unit outputs the frame data SFRAM (frame data SFRAM received from the frame generation unit FGEN) which is stored in the buffer or the like within the retransmission control unit RTCLT to the frame transmission unit FSEN. Thus, the retransmission of the frame data SFRAM is performed.

In addition, the retransmission control unit RTCLT includes an abnormality detection unit FDET. The abnormality detection unit FDET is an example of a first detection unit that detects abnormality in a process related to the retransmission of the frame data SFRAM transferred to an external device (for example, the information processing apparatus PDEV which is a communication destination) through the physical layer PHY. For example, when the abnormality detection unit FDET detects the deterioration in a bit error rate, retry out, and the like, the abnormality detection unit determines that abnormality has occurred in the process related to the retransmission. For example, the deterioration in the bit error rate is detected in a case where the number of retransmissions within a predetermined period of time exceeds a threshold value. In addition, for example, the retry out is detected in a case where there is no response (positive acknowledgement signal ACK or negative acknowledgement signal NACK) to the transmitted frame data SFRAM and in a case where the number of consecutive retransmissions exceeds a threshold value.

When the abnormality detection unit FDET detects abnormality in the process related to the retransmission, the abnormality detection unit outputs a retransmission error notification RERR indicating that abnormality has occurred in the process related to the retransmission, to the link control unit LCLT.

The frame reception unit FREC is an interface circuit for receiving the frame data RFRAM from the physical layer PHY. The frame data RFRAM transferred to the frame reception unit FREC from the physical layer PHY corresponds to the frame data SFRAM transmitted from the frame transfer circuit FTR of the information processing apparatus PDEV which is a communication destination.

The frame reception unit FREC performs the transfer of an asynchronous clock to and from the physical layer PHY, and outputs the frame data RFRAM received from the physical layer PHY, to the buffer unit RBUF. In addition, the frame reception unit FREC has a function of detecting a control data link layer packet (DLLP).

For example, when the frame reception unit FREC detects flow control information FINF (flow control frame) related to flow control, the frame reception unit outputs the detected flow control information FINF to the flow control unit FCLT. For example, a credit release notification indicating an idle state of the buffer unit RBUF of the information processing apparatus PDEV which is a communication destination is included in the flow control information FINF.

In addition, for example, when the frame reception unit FREC detects link control information indicating the linking-up/linking-down of a data link layer, degeneration information DINFR on the degeneration of a physical lane PHL, and the like, the frame reception unit outputs the detected link control information to the link control unit LCLT. For example, when the frame reception unit FREC detects the degeneration information DINFR related to the degeneration of the physical lane PHL, the frame reception unit outputs the detected degeneration information DINFR to the link control unit LCLT. The degeneration information DINFR corresponds to degeneration information DINFS transmitted from the link control unit LCLT of the information processing apparatus PDEV which is a communication destination. Hereinafter, a description may be given by rereading the degeneration information DINFR as degeneration information DINFS.

In addition, for example, when the frame reception unit FREC detects a response signal such as a positive acknowledgement signal ACK or a negative acknowledgement signal NACK, the frame reception unit outputs the detected response signal (positive acknowledgement signal ACK or negative acknowledgement signal NACK) to the retransmission control unit RTCLT.

The buffer unit RBUF sequentially stores the frame data RFRAM received from the frame reception unit FREC, and sequentially outputs the stored frame data RFRAM to the CPU as data RDATA.

The flow control unit FCLT performs flow control for transferring the frame data SFRAM to the information processing apparatus PDEV which is a communication destination. For example, the flow control unit FCLT controls the frame generation unit FGEN based on an idle state of the buffer unit RBUF of the information processing apparatus PDEV which is a communication destination and a data length of the frame data SFRAM. Thus, the transmission of the frame data SFRAM is controlled, and an idle state of the buffer unit RBUF of the information processing apparatus PDEV which is a communication destination is managed.

For example, when the flow control unit FCLT receives flow control information FINF indicating that there is no vacancy in the buffer unit RBUF of the information processing apparatus PDEV which is a communication destination, the flow control unit controls the frame generation unit FGEN so as to suppress the transmission of the frame data SFRAM.

In addition, the flow control unit FCLT periodically receives information indicating an idle state of the buffer unit RBUF, and the like from the buffer unit RBUF. The flow control unit FCLT periodically outputs information indicating the state of the buffer unit RBUF to the frame generation unit FGEN. Thus, the flow control unit FCLT of the information processing apparatus PDEV which is a communication destination is periodically notified of the flow control information FINF indicating the state of the buffer unit RBUF. That is, the flow control unit FCLT periodically receives the flow control information FINF indicating the state of the buffer unit RBUF of the information processing apparatus PDEV which is a communication destination.

Further, the flow control unit FCLT includes an error detection unit EDET. The error detection unit EDET is an example of a second detection unit that detects abnormality in flow control for transferring the frame data SFRAM to an external device (for example, the information processing apparatus PDEV which is a communication destination). For example, the abnormality in the flow control is detected when the length of a period for which the flow control frame (flow control information FINF) has not been received exceeds a threshold value. For example, when the error detection unit EDET has not received the next flow control information FINF before a predetermined period of time elapses after receiving the flow control information FINF, the error detection unit determines that abnormality has occurred in the flow control. Hereinafter, the abnormality in the flow control is also referred to as a flow control protocol error.

When the error detection unit EDET detects the abnormality in the flow control, the error detection unit outputs a flow control protocol error notification FERR indicating that the abnormality has occurred in the flow control to the link control unit LCLT. Hereinafter, the flow control protocol error notification FERR will be also referred to as a flow control protocol error (FCPE) notification FERR.

The link control unit LCLT performs the control of the physical layer PHY, the control of the link, the degeneration of the physical lane PHL, and the like. For example, in the control of the physical layer PHY, when the link control unit LCLT instructs the physical layer PHY to start, the link control unit outputs the instruction notification SINF for instructing the physical layer to start, to the physical layer PHY. For example, when the start of the physical layer PHY is completed, the link control unit LCLT receives the start completion notification CINF from the physical layer PHY. In addition, for example, when the link control unit LCLT instructs the physical layer PHY to stop, the link control unit outputs the instruction notification SINF for instructing the physical layer PHY to stop to the physical layer PHY.

In the control of the link, for example, the link control unit LCLT performs processing of cutting the link based on an error notification from each module, processing of notifying each module of the state of the link, and the like. In addition, for example, the degeneration of the physical lane PHL is performed by the information acquisition unit ACQ and the selection unit SEL which are included in the link control unit LCLT, and the like. For example, the information acquisition unit ACQ receives the AM detection information AINF and the error information EINF from the physical layer PHY. In addition, the selection unit SEL outputs the enable signal LEN and the degeneration information DINFS of the physical lane PHL to the physical layer PHY and the frame generation unit FGEN, respectively.

Figure 4:
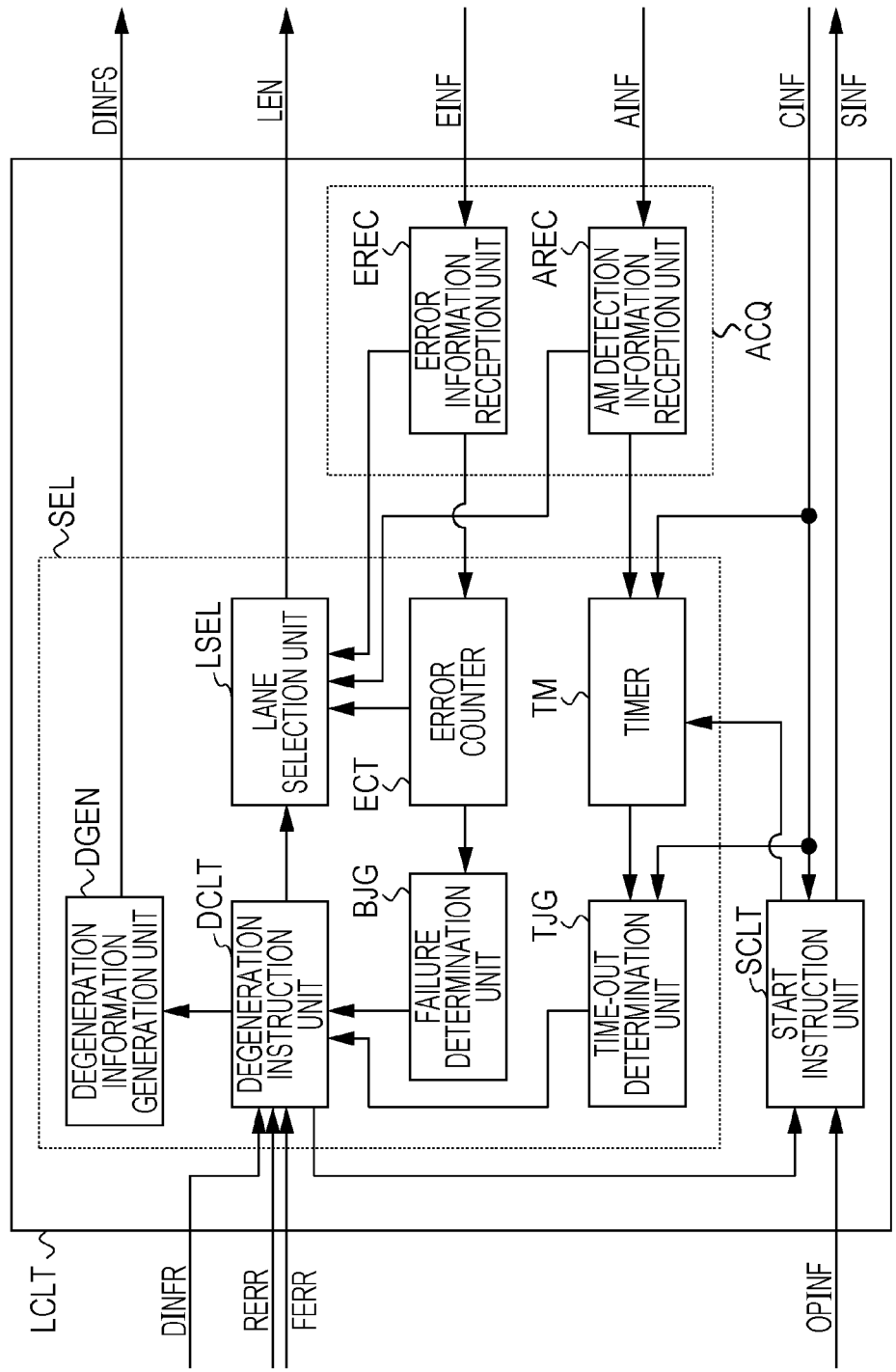
FIG. 4 is a diagram illustrating an example of a link control unit illustrated in FIG. 3.

FIG. 4 illustrates an example of the link control unit LCLT illustrated in FIG. 3. The link control unit LCLT includes a start instruction unit SCLT, the information acquisition unit ACQ, and the selection unit SEL. The information acquisition unit ACQ includes an error information reception unit EREC and an AM detection information reception unit AREC. In addition, the selection unit SEL includes a timer TM, a time-out determination unit TJG, an error counter ECT, a failure determination unit BJG, a degeneration instruction unit DCLT, a lane selection unit LSEL, and a degeneration information generation unit DGEN.

The start instruction unit SCLT receives, for example, a user instruction OPINF. For example, when a user instructs the physical layer PHY to start by operating an operation unit of the information processing apparatus PDEV, or the like, the start instruction unit SCLT receives the user instruction OPINF for instructing the physical layer to start. The start instruction unit SCLT outputs the instruction notification SINF for instructing the physical layer to start, to the physical layer PHY. Further, the start instruction unit SCLT starts the timer TM in response to an initial start instruction.

When the start of the physical layer PHY is completed, the start instruction unit SCLT receives the start completion notification CINF indicating the completion of the start of the physical layer, from the physical layer PHY. In addition, for example, when a user instructs the physical layer PHY to stop by operating an operation unit of the information processing apparatus PDEV, or the like, the start instruction unit SCLT receives the user instruction OPINF for instructing the physical layer to stop. The start instruction unit SCLT outputs the instruction notification SINF for instructing the physical layer PHY to stop.

In addition, the start instruction unit SCLT receives a notification for instructing the physical layer PHY to restart, from the degeneration instruction unit DCLT. In this case, for example, the start instruction unit SCLT outputs the instruction notification SINF for instructing the physical layer PHY to stop and then outputs the instruction notification SINF for instructing the physical layer PHY to start. For example, the start instruction unit SCLT does not enable the timer TM at the time of the restart of the physical layer.

The AM detection information reception unit AREC receives the AM detection information AINF of the PCS lanes PLr from the physical layer PHY. For example, when the AM detection information reception unit AREC receives one or more pieces of AM detection information AINF indicating that an alignment marker is detected the AM detection information reception unit instructs the timer TM to start measurement. For example, when the AM detection information reception unit AREC receives one or more pieces of AM detection information AINF indicating that an alignment marker is detected, the AM detection information reception unit outputs a start instruction signal to the timer TM.

In addition, the AM detection information reception unit AREC outputs the AM detection information AINF of the PCS lanes PLr to the lane selection unit LSEL. The AM detection information reception unit AREC may periodically read out the AM detection information AINF from the physical layer PHY, for example, by using a function of notifying alignment detection information which is specified in the IEEE802.3ba standard.

For example, when the timer TM receives the start instruction signal from the AM detection information reception unit AREC, the timer TM starts measurement for a predetermined period of time (for example, 4 milliseconds). In addition, the timer TM receives the start completion notification CINF from the physical layer PHY. The timer TM stops the measurement in response to the reception of the start completion notification CINF. In addition, when the measurement for a predetermined period of time is terminated, the timer TM outputs information indicating a predetermined period of time has elapsed, to the time-out determination unit TJG.

The time-out determination unit TJG receives the start completion notification CINF from the physical layer PHY. When the time-out determination unit TJG does not receive the start completion notification CINF from the physical layer PHY before the predetermined period of time elapses, the time-out determination unit determines that a lane failure has occurred. In this case, the time-out determination unit TJG outputs information indicating that a lane failure has occurred to the degeneration instruction unit DCLT.

The error information reception unit EREC receives the error information EINF of the PCS lanes PLr from the physical layer PHY. The error information reception unit EREC outputs the error information EINF of the PCS lanes PLr to the lane selection unit LSEL and the error counter ECT. The error information reception unit EREC may periodically read out the number of BIP errors from the physical layer PHY, for example, by using a function of notifying the number of BIP errors which is specified in the IEEE802.3ba standard.

The error counter ECT is an example of a measurement unit that measures the number of errors occurring over a predetermined period (for example, the number of BIP errors) for each physical lane PHL based on the error information EINF. For example, the error counter ECT measures the number of BIP errors within a predetermined period of time (for example, 80 milliseconds) for each physical lane PHL based on the pieces of error information EINF of the PCS lanes PLr which are received from the error information reception unit EREC. The error counter ECT outputs information indicating the number of BIP errors of the physical lanes PHL to the failure determination unit BJG and the lane selection unit LSEL.

The failure determination unit BIG determines whether or not a failure has occurred in the physical lane PHL based on the information indicating the number of BIP errors of the physical lanes PHL within a predetermined period of time. Thus, it is determined whether or not a lane failure has occurred. For example, when the failure determination unit BIG determines that a lane failure has occurred, the failure determination unit outputs information indicating the lane failure has occurred to the degeneration instruction unit DCLT.

The degeneration instruction unit DCLT receives the degeneration information DINFR, the retransmission error notification RERR, and the FCPE notification FERR from the frame reception unit FREC, the abnormality detection unit FDET of the retransmission control unit RTCLT, and the error detection unit EDET of the flow control unit FCLT, respectively. In addition, the degeneration instruction unit DCLT receives information indicating that a lane failure has occurred from the time-out determination unit TJG and the failure determination unit BIG. The degeneration instruction unit DCLT outputs, for example, information indicating whether to perform lane degeneration, to the lane selection unit LSEL. In addition, for example, the degeneration instruction unit DCLT outputs information for generating the degeneration information DINFS to be forwarded to the information processing apparatus PDEV which is a communication destination, to the degeneration information generation unit DGEN.

The lane selection unit LSEL selects the physical lane PHL to be used for data transfer to and from the information processing apparatus PDEV which is a communication destination, based on the pieces of information received from the degeneration instruction unit DCLT, the AM detection information reception unit AREC, the error information reception unit EREC, and the error counter ECT. For example, the lane selection unit LSEL outputs the enable signal LEN for enabling the physical lane PHL to be used for data transfer to and from the information processing apparatus PDEV which is a communication destination, to the physical layer PHY.

The degeneration information generation unit DGEN generates degeneration information DINFS based on the information received from the degeneration instruction unit DCLT. Then, the degeneration information generation unit DGEN outputs the degeneration information DINFS to the frame generation unit FGEN. Thus, the degeneration information DINFS is transferred to the information processing apparatus PDEV which is a communication destination as degeneration information DINFR.

The configuration of the link control unit LCLT is not limited to the above-mentioned example. For example, the start instruction unit SCLT may enable the timer TM even at the time of the restart of the physical layer.

Figure 5:
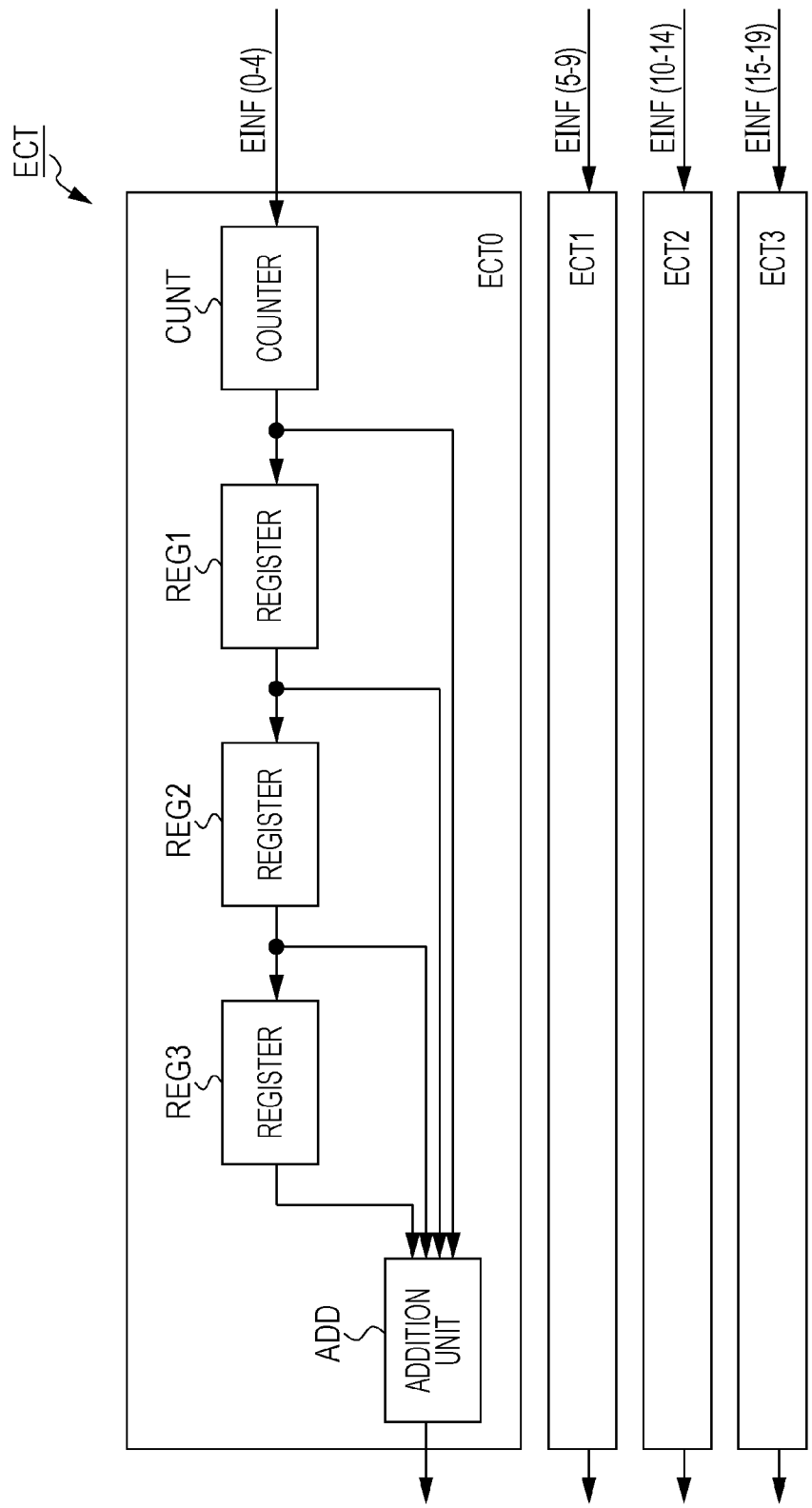
FIG. 5 is a diagram illustrating an example of an error counter illustrated in FIG. 4.

FIG. 5 illustrates an example of the error counter ECT illustrated in FIG. 4. The error counter ECT includes, for example, error counters ECT0, ECT1, ECT2, and ECT3. For example, the error counters ECT0 to ECT3 count BIP errors of the physical lanes PHLr0 to PHLr4 within a predetermined period of time. The numbers in brackets at the ends of the signs for pieces of error information EINF illustrated in FIG. 5 correspond to, for example, the numbers at the ends of the signs for the PCS lanes PHLr0 to PHLr19 illustrated in FIG. 2.

The configurations and operations of the error counters ECT1 to ECT3 are the same as or similar to those of the error counter ECT0. Accordingly, in FIG. 5, the error counter ECT0 will be described. For example, the error counter ECT0 measures the number of BIP errors of the physical lane PHLr0 which occur over approximately 80 milliseconds. For example, the error counter ECT0 starts the measurement by using the linking-up of the physical layer PHY as a trigger, and updates a measured value (the number of BIP errors occurring over approximately 80 milliseconds) for every approximately 20 milliseconds.

The error counter ECT0 includes, for example, a counter CUNT, registers REG1, REG2, and REG3, and an addition unit ADD. For example, the counter CUNT and the registers REG1 and REG2 relay values held therein to the registers REG1, REG2, and REG3 at the subsequent stages for every approximately 20 milliseconds.

For example, at a transfer rate of 100 Gbps, the time for the physical layer PHY to receive 16384 of 64B/66B code blocks is approximately 210 microseconds. In this case, for example, the counter CUNT adds up the total number of BIP errors of the physical lane PHLr0 (the number of BIP errors of the PCS lanes PHLr0 to PHLr4) for every approximately 210 microseconds. The counter CUNT transfers the sum value (the number of BIP errors of the physical lane PHLr0 which occur over approximately 20 milliseconds) to the register REG1 at the subsequent state for every approximately 20 milliseconds. At this time, the registers REG1 and REG2 also transfer values held therein to the registers REG2 and REG3 at the subsequent stages.

In addition, the counter CUNT and the registers REG1, REG2, and REG3 output the values held therein to the addition unit ADD, for example, at a timing when the counter CUNT transfers the sum value to the register REG1. For example, the counter CUNT outputs the number of BIP errors of the physical lane PHLr0 which occur over approximately 20 milliseconds from the present point in time to approximately 20 milliseconds before, to the addition unit ADD. In addition, the register REG1 outputs the number of BIP errors of the physical lane PHLr0 which occur over approximately 20 milliseconds from approximately 20 milliseconds before to approximately 40 milliseconds before, to the addition unit ADD. The register REG2 outputs the number of BIP errors of the physical lane PHLr0 which occur over approximately 20 milliseconds from approximately 40 milliseconds before to approximately 60 milliseconds before, to the addition unit ADD. The register REG3 outputs the number of BIP errors of the physical lane PHLr0 which occur over approximately 20 milliseconds from approximately 60 milliseconds before to approximately 80 milliseconds before, to the addition unit ADD.

The addition unit ADD adds up the values received from the counter CUNT and the registers REG1, REG2, and REG3. Thus, the number of BIP errors of the physical lane PHLr0 which occur over approximately 80 milliseconds is calculated. The addition unit ADD outputs a result of the addition (the number of BIP errors of the physical lane PHLr0 which occur over approximately 80 milliseconds) to the failure determination unit BJG. The result of the addition which is output from the addition unit ADD is updated, for example, for every approximately 20 milliseconds. Accordingly, the failure determination unit BIG determines whether or not a failure has occurred in the physical lane PHL, for every approximately 20 milliseconds.

The configuration of the error counter ECT and the numerical examples such as a predetermined period of time are not limited to the above-mentioned examples. For example, when the number of BIP errors of the physical lane PHLr0 which occur over approximately 40 milliseconds is used for the determination, the registers REG2 and REG3 may be omitted.

FIG. 6 illustrates an example of a trigger of lane degeneration. The link control unit LCLT performs lane degeneration by using the detection of a failure of the PCS lane PL or the physical lane PHL as a trigger before linking up the physical layer PHY. The link control unit LCLT performs lane degeneration by using one of the deterioration in a bit error rate, the detection of retry out, the detection of a flow control protocol error, and the number of BIP errors being within a predetermined period of time which exceeds a threshold value, as a trigger after linking up the physical layer PHY.

The deterioration in a bit error rate is detected, for example, when the number of retransmissions within a predetermined period of time exceeds a threshold value. For example, when 255 or more retransmission requests occur over 24 seconds, the abnormality detection unit FDET determines a bit error rate to deteriorate.

The retry out is detected, for example, when there is no response (positive acknowledgement signal ACK or negative acknowledgement signal NACK) to transmitted frame data SFRAM or when the number of consecutive retransmissions exceeds a threshold value. For example, when the abnormality detection unit FDET has not received the positive acknowledgement signal ACK or the negative acknowledgement signal NACK before a predetermined period of time (for example, 12.62 milliseconds) elapses after receiving the frame data SFRAM, the abnormality detection unit determines retry out. In addition, for example, when the number of consecutive retransmissions exceeds a threshold value (for example, 255 times), the abnormality detection unit FDET determines retry out.

The flow control protocol error is detected when the length of a period for which the flow control frame (flow control information FINF) has not been received exceeds a threshold value (for example, 200 microseconds). In this manner, the frame transfer circuit FTR detects a trigger of the lane degeneration based on error detection information of a communication protocol which is higher than the physical layer PHY. In addition, the link control unit LCLT performs lane degeneration when one of plural types of errors is detected, and thus it is possible to appropriately avoid the use of the defective lane PHL.

Figure 7:
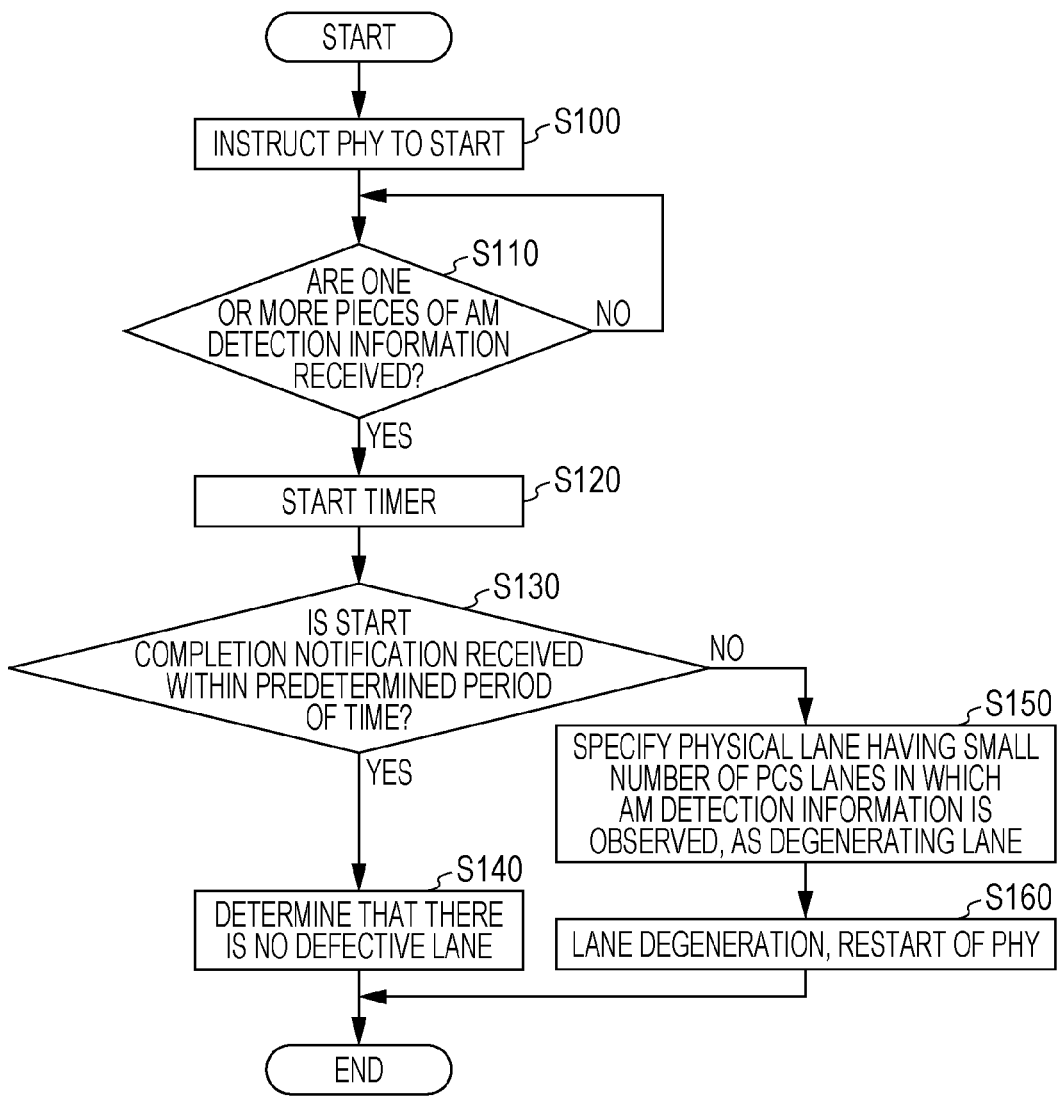
FIG. 7 is a diagram illustrating an example of an operation of the information processing apparatus illustrated in FIG. 1 before a link-up.

FIG. 7 illustrates an example of an operation of the information processing apparatus PDEV illustrated in FIG. 1 before a link-up. That is, FIG. 7 illustrates an embodiment of a method of controlling a parallel computer system. FIG. 7 illustrates an example of an operation of the link control unit LCLT related to lane degeneration before linking up the physical layer PHY. The operation illustrated in FIG. 7 may be realized with hardware only or may be realized by controlling hardware by software. For example, software such as a control program may cause a computer to execute the operation illustrated in FIG. 7. That is, the computer may read a storage medium having a control program recorded thereon and execute the operation illustrated in FIG. 7.

In step S100, the start instruction unit SCLT instructs the physical layer PHY to start, for example, in response to a start instruction from a user.

In step S110, the AM detection information reception unit AREC determines whether or not one or more pieces of AM detection information AINF, indicating that AM alignment marker is detected, have been received. That is, the AM detection information reception unit AREC determines whether or not the AM detection information AINF has been observed in one or more PCS lanes PL.

When one or more pieces of AM detection information AINF have been received (Yes in step S110), the operation of the link control unit LCLT proceeds to step S120. On the other hand, when any AM detection information AINF has not been received (No in step S110), the operation of the link control unit LCLT returns to step S110. That is, the process of step S120 and the subsequent processes are performed, for example, when data (data including an alignment marker) which is transferred from the information processing apparatus PDEV which is a communication destination is observed in one or more PCS lanes PL.

In step S120, the timer TM starts measurement for a predetermined period of time (for example, 4 milliseconds). That is, the timer TM starts measurement for a predetermined period of time after the data including an alignment marker is observed in one or more PCS lanes PL.

In step S130, the time-out determination unit TJG determines whether or not the start completion notification CINF has been received from the physical layer PHY before a predetermined period of time elapses after the measurement is started in step S120. That is, the time-out determination unit TJG determines whether or not an alignment marker has been detected in all the PCS lanes PL before a predetermined period of time elapses after an initial alignment marker is detected.

When the start completion notification CINF has been received before a predetermined period of time elapses (Yes in step S130), the operation of the link control unit LCLT proceeds to step S140. On the other hand, when the start completion notification CINF has not been received before a predetermined period of time elapses (No in step S130), the operation of the link control unit LCLT proceeds to step S150.

In step S140, the link control unit LCLT determines that there is no defective lane. That is, when the link control unit LCLT receives the start completion notification CINF before a predetermined period of time elapses, the link control unit terminates a process related to lane degeneration (hereinafter, also referred to as a lane degeneration process) without performing the lane degeneration.

In step S150, the lane selection unit LSEL specifies a physical lane PHL having a small number of PCS lanes PL in which the AM detection information AINF is observed, as a degenerating lane.

In step S160, the lane selection unit LSEL performs lane degeneration so as not to use the physical lane PHL (degenerating lane PHL) which is specified in step S150. For example, the lane selection unit LSEL selects a physical lane PHL to be used for data transfer to and from the information processing apparatus PDEV which is a communication destination, from physical lanes PHL except for the physical lane PHL (degenerating lane PHL) which is specified in step S150, and sets the selected physical lane PHL to be in an enable state. In an initial state, for example, all the physical lanes PHL are set to be in an enable state.

In addition, the degeneration instruction unit DCLT outputs a notification for instructing the physical layer PHY to restart, to the start instruction unit SCLT. The start instruction unit SCLT instructs the physical layer PHY to restart, for example, in response to the restart instruction from the degeneration instruction unit DCLT. In addition, the degeneration information generation unit DGEN outputs degeneration information DINFS for requesting lane degeneration from the information processing apparatus PDEV which is a communication destination, to the frame generation unit FGEN. Thus, the information processing apparatus PDEV which is a communication destination receives a degeneration request DLLP including the degeneration information DINFS for requesting lane degeneration. As a result, the information processing apparatus PDEV which is a communication destination may select a physical lane PHL to be used for data transfer, and the like.

In the restart of the physical layer PHY which is performed by lane degeneration, the contents set in step S160 are relayed to the setting of the physical lane PHL in an enable state. In the restart of the physical layer PHY which is performed by lane degeneration, the lane degeneration has already been performed, and thus the lane degeneration process of FIG. 7 is not performed.

In this manner, when the lane selection unit LSEL has not received the start completion notification CINF within a predetermined period of time during a period until the start instruction unit SCLT receives a notification of the start completion from the physical layer PHY after instructing the physical layer PHY to start, the lane selection unit performs the processes of step S150 and step S160. That is, when the lane selection unit LSEL has not received the start completion notification CINF from the physical layer PHY before a predetermined period of time elapses after the AM detection information AINF is detected in one PCS lane PL, the lane selection unit determines a degenerating lane PHL based on the AM detection information.

Accordingly, the frame transfer circuit FTR may specify a degenerating lane before a link-up by referring to the AM detection information AINF and the like even when a physical layer PHY that does not have a defective lane specification function is used. The operation of the information processing apparatus PDEV before a link-up is not limited to the above-mentioned example. For example, the information processing apparatus PDEV may perform a lane degeneration process even when the physical layer PHY is restarted.

FIG. 8 illustrates an example of a method of specifying a degenerating lane PHL. FIG. 8 illustrates an example of a method of specifying a degenerating lane PHL before linking up a physical layer PHY.

In the physical lane PHLr0, an alignment marker is detected in the PCS lanes PLr0 to PLr4, and thus the number of PCS lanes PLr in which an alignment marker is detected is 5. In the physical lane PHLr1, an alignment marker is detected in the PCS lanes PLr5 to PLr9, and thus the number of PCS lanes PLr in which an alignment marker is detected is 5. In the physical lane PHLr2, an alignment marker is detected in the PCS lanes PLr10 to PLr14, and thus the number of PCS lanes PLr in which an alignment marker is detected is 5.

In the physical lane PHLr3, an alignment marker is detected in the PCS lanes PLr15 and PLr17 to PLr19 and an alignment marker is not detected in the PCS lane PLr16, and thus the number of PCS lanes PLr is 4. Accordingly, for example, in step S150 illustrated in FIG. 7, the lane selection unit LSEL specifies the physical lane PHLr3 having a small number of PCS lanes PLr in which an alignment marker is detected, as a degenerating lane. Accordingly, the physical lanes PHLr0 to PHLr2 are determined to be normal physical lanes PHLr. In this manner, the lane selection unit LSEL specifies the degenerating lane PHL based on the AM detection information AINF.

For example, where there are a plurality of physical lanes PHLr including a PCS lane PLr in which an alignment marker is not detected, the lane selection unit LSEL may determine the plurality of physical lanes PHLr to be degenerating lanes.

FIG. 9 illustrates another example of a method of specifying a degenerating lane PHL. FIG. 9 illustrates an example of a method of specifying a degenerating lane PHL after linking up the physical layer PHY. In FIG. 9, the presence or absence of a BIP error illustrates an example of results of the detection of a BIP error in a case where some timings are extracted over a predetermined period of time (for example, 80 milliseconds). In addition, a threshold value for determining whether or not being a degenerating lane is, for example, 3.

In the physical lane PHLr0, the total number of BIP errors of the PCS lanes PLr0 to PLr4 which have been detected over the past 80 milliseconds is 4. In the physical lane PHLr1, the total number of BIP errors of the PCS lanes PLr5 to PLr9 which have been detected over the past 80 milliseconds is 1. In the physical lane PHLr2, the total number of BIP errors of the PCS lanes PLr10 to PLr14 which have been detected over the past 80 milliseconds is 2. In the physical lane PHLr3, the total number of BIP errors of the PCS lanes PLr15 to PLr19 which have been detected over the past 80 milliseconds is 0.

Figure 10:
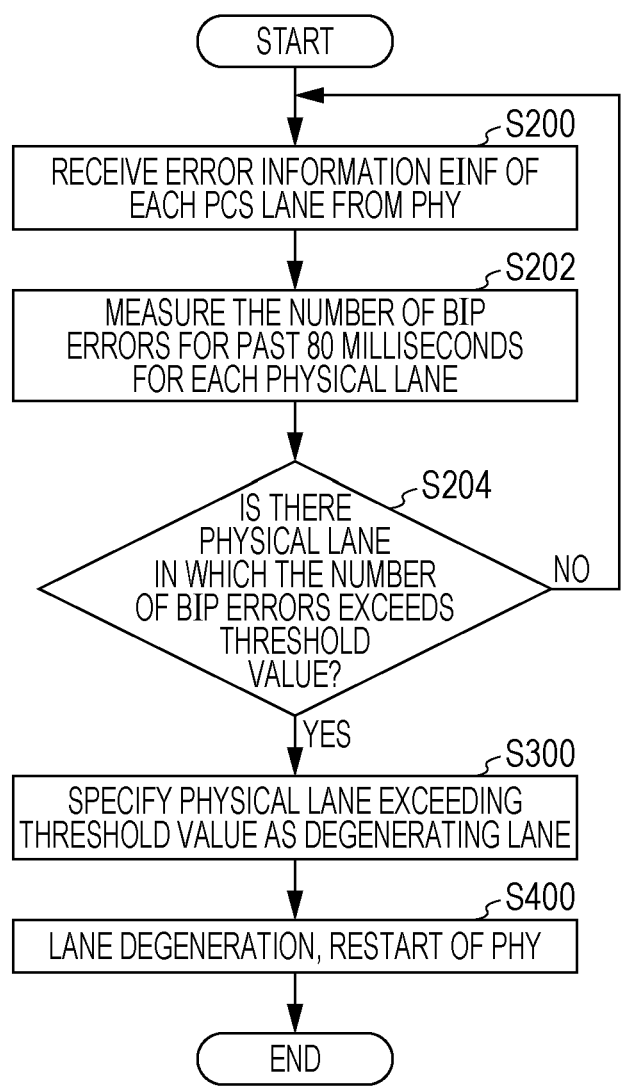
FIG. 10 is a diagram illustrating an example of an operation of the information processing apparatus illustrated in FIG. 1 after a link-up.

Therefore, for example, in step S300 illustrated in FIG. 10, the lane selection unit LSEL determines the physical lane PHLr0, having the number of BIP errors in a predetermined period of time exceeding a threshold value (3 in FIG. 9), to be a degenerating lane. Alternatively, in step S314 illustrated in FIG. 11 or in step S334 illustrated in FIG. 13, the lane selection unit LSEL determines the physical lane PHLr0, having the largest number of BIP errors in a predetermined period of time, to be a degenerating lane. Accordingly, the physical lanes PHLr1 to PHLr3 are determined to be normal physical lanes PHLr. In this manner, the lane selection unit LSEL determines a degenerating lane PHL based on error information EINF indicating that data, which is transferred to the physical layer PHY from the information processing apparatus PDEV which is a communication destination, has an error.

FIG. 10 illustrates an example of an operation of the information processing apparatus PDEV illustrated in FIG. 1 after a link-up. That is, FIG. 10 illustrates an embodiment of a method of controlling a parallel computer system. FIG. 10 illustrates an example of an operation of the link control unit LCLT which is related to lane degeneration after linking up the physical layer PHY. For example, in the operation of FIG. 10, a trigger of lane degeneration is a case where the number of BIP errors within a predetermined period of time exceeds a threshold value (for example, a case where the number of BIP errors within a predetermined period of time exceeds a threshold value, which is illustrated in FIG. 6). In the example of FIG. 10, a predetermined period of time at the time of measuring the number of BIP errors of the physical lanes PHL is 80 milliseconds.

The operation illustrated in FIG. 10 may be realized with hardware only or may be realized by controlling hardware by software. For example, software such as a control program may cause a computer to execute the operation illustrated in FIG. 10. That is, the computer may read a storage medium having a control program recorded thereon and execute the operation illustrated in FIG. 10.

In step S200, for example, the error information reception unit EREC receives error information EINF of each PCS lane PL from the physical layer PHY.

In step S202, the error counter ECT measures the number of BIP errors for the past 80 milliseconds for each physical lane PHL. For example, the error counter ECT counts the BIP errors of the physical lanes PHL which occur over the past 80 milliseconds, and updates the counted value for every approximately 20 milliseconds.

In step S204, the failure determination unit BJG determines whether or not there is a physical lane PHL in which the number of BIP errors calculated in step S202 exceeds a threshold value (for example, 255). When there is a physical lane PHL in which the number of BIP errors exceeds a threshold value (Yes in step S204), the operation of the link control unit LCLT proceeds to step S300. That is, when a trigger of lane degeneration is detected, the operation of the link control unit LCLT proceeds to step S300. Step S200 to step S204 correspond to a process of detecting a trigger of lane degeneration.

On the other hand, when there is no physical lane PHL in which the number of BIP errors exceeds a threshold value (No in step S204), the operation of the link control unit LCLT returns to step S200. That is, when the number of BIP errors for the past 80 milliseconds is equal to or less than a threshold value in all the physical lanes PHL, the operation of the link control unit LCLT returns to step S200.

In step S300, the lane selection unit LSEL specifies a physical lane PHL in which the number of BIP errors exceeds a threshold value for the past 80 milliseconds, as a degenerating lane. For example, the failure determination unit BJG notifies the degeneration instruction unit DCLT of the presence of a degenerating lane. Thus, for example, the degeneration instruction unit DCLT instructs the lane selection unit LSEL to degenerate the physical lane PHL in which the number of BIP errors exceeds a threshold value.

Then, the lane selection unit LSEL detects a physical lane PHL (degenerating lane) in which the number of BIP errors for the past 80 milliseconds exceeds a threshold value, based on the number of BIP errors which is calculated in step S202. The lane selection unit LSEL may receive information, indicating the physical lane PHL in which the number of BIP errors for the past 80 milliseconds exceeds a threshold value, from the failure determination unit BIG.

In step S400, the link control unit LCLT performs lane degeneration and instructs the physical layer PHY to restart. For example, the lane selection unit LSEL selects a physical lane PHL to be used for data transfer to and from the information processing apparatus PDEV which is a communication destination, from physical lanes PHL except for the physical lane PHL (degenerating lane PHL) which is specified in step S300, and sets the selected physical lane PHL to be in an enable state. In this manner, the lane selection unit LSEL performs lane degeneration so as not to use the physical lane PHL (degenerating lane PHL) which is specified in step S300.

For example, when the operation illustrated in FIG. 10 is performed after the lane degeneration, a physical lane PHL set to be in a disable state before performing the operation illustrated in FIG. 10 is not included in physical lanes PHL to be selected. In this case, for example, the physical lane PHL to be selected is a physical lane PHL except for the physical lane PHL (degenerating lane PHL) which is specified in step S300 from physical lanes PHL set to be in an enable state before performing the operation illustrated in FIG. 10.

In addition, the degeneration instruction unit DCLT outputs a notification for instructing the physical layer PHY to restart, to the start instruction unit SCLT. Then, the start instruction unit SCLT instructs the physical layer PHY to restart, for example, in response to the restart instruction from the degeneration instruction unit DCLT.

In addition, the degeneration information generation unit DGEN outputs degeneration information DINFS for requesting lane degeneration from the information processing apparatus PDEV which is a communication destination, to the frame generation unit FGEN. Thus, the information processing apparatus PDEV which is a communication destination receives a degeneration request DLLP including the degeneration information DINFS for requesting lane degeneration. As a result, the information processing apparatus PDEV which is a communication destination may select a physical lane PHL to be used for data transfer, and the like.

In the restart of the physical layer PHY which is performed by lane degeneration, the contents set in step S400 are relayed to the setting of the physical lane PHL in an enable state. In the restart of the physical layer PHY which is performed by lane degeneration, the lane degeneration is already performed, and thus the lane degeneration process before linking up the physical layer PHY which is illustrated in FIG. 7 is not performed.

As described above, in the operation illustrated in FIG. 10, the lane selection unit LSEL specifies a degenerating lane PHL based on error information EINF indicating that data, which is transferred to the physical layer PHY from the information processing apparatus PDEV which is a communication destination, has an error. Accordingly, the frame transfer circuit FTR may specify a degenerating lane after a link-up by referring to the error information EINF and the like even when a physical layer PHY that does not have a defective lane specification function is used. The operation of the information processing apparatus PDEV after a link-up is not limited to the above-mentioned example.

Figure 11:
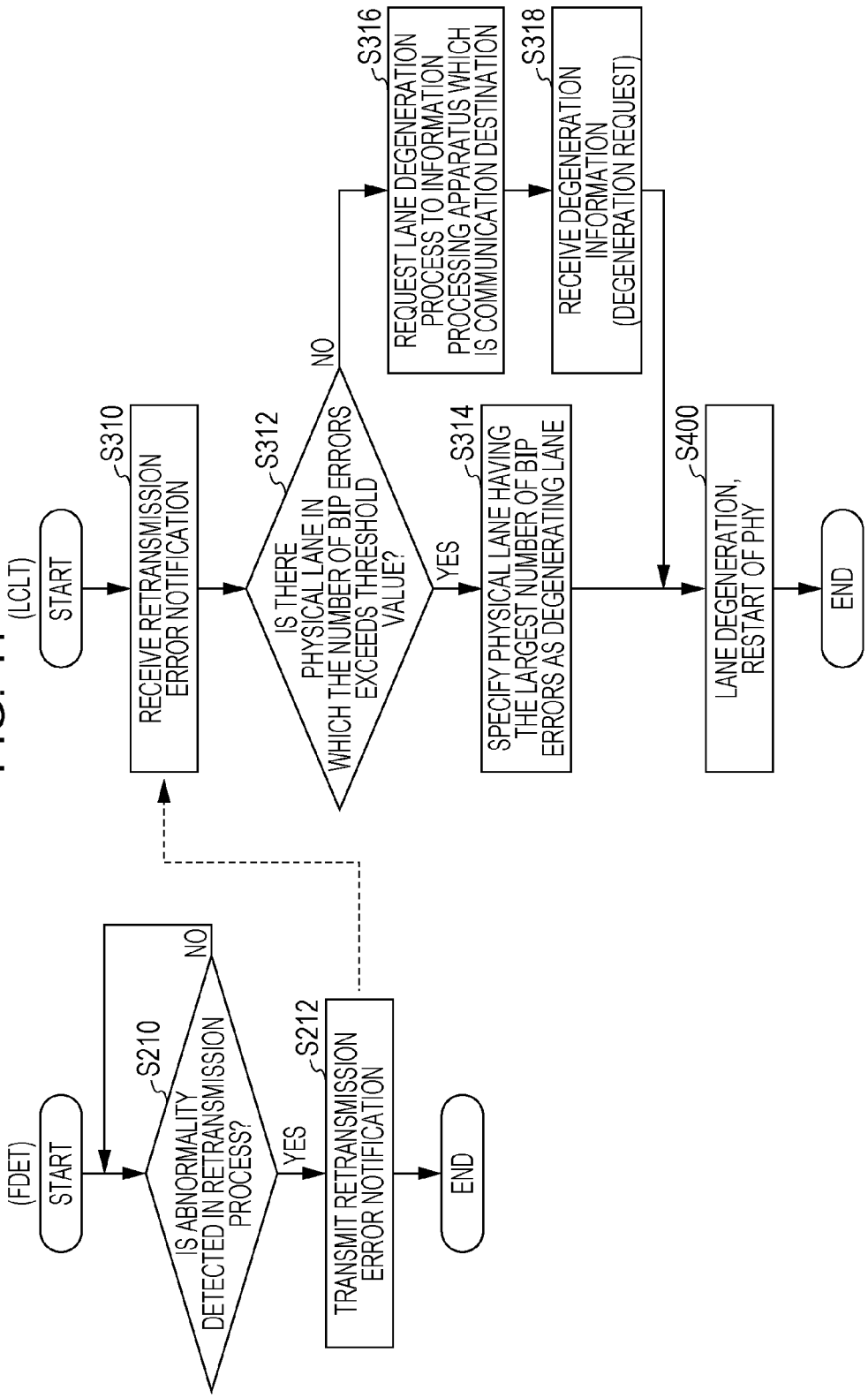
FIG. 11 is a diagram illustrating another example of an operation of the information processing apparatus illustrated in FIG. 1 after a link-up.

FIG. 11 illustrates another example of an operation of the information processing apparatus PDEV illustrated in FIG. 1 after a link-up. That is, FIG. 11 illustrates an embodiment of a method of controlling a parallel computer system. FIG. 11 illustrates an example of operations of the link control unit LCLT and the abnormality detection unit FDET which are related to lane degeneration after linking up the physical layer PHY. For example, step S210 and step S212 correspond to a process of detecting a trigger of lane degeneration and are performed by the abnormality detection unit FDET. In addition, step S310 to S318 and step S400 are performed by the link control unit LCLT.

In the operation illustrated in FIG. 11, for example, a trigger of lane degeneration is the detection of abnormality in a retransmission process (for example, the detection of the deterioration in a bit error rate and the detection of retry out which are illustrated in FIG. 6). The operation illustrated in FIG. 11 may be realized with hardware only or may be realized by controlling hardware by software. For example, software such as a control program may cause a computer to execute the operation illustrated in FIG. 11. That is, the computer may read a storage medium having a control program recorded thereon and execute the operation illustrated in FIG. 11.

In step S210, the abnormality detection unit FDET determines whether or not abnormality has occurred in a process related to retransmission (retransmission process). For example, the abnormality detection unit FDET performs a process of detecting abnormality in the retransmission process. When the abnormality detection unit FDET detects, for example, the deterioration in a bit error rate or retry out, the abnormality detection unit determines that abnormality has occurred in the retransmission process.

For example, when a number of retransmissions equal to or greater than a threshold value (for example, 255 times) are requested for a predetermined period of time (for example, for 24 seconds), the abnormality detection unit FDET determines a bit error rate to deteriorate. In addition, for example, when the abnormality detection unit FDET has not received a positive acknowledgement signal ACK or a negative acknowledgement signal NACK before a predetermined period of time (for example, 12.62 milliseconds) elapses after transmitting frame data SFRAM, the abnormality detection unit determines retry out. Alternatively, when the number of consecutive retransmissions exceeds a threshold value (for example, 255 times), the abnormality detection unit FDET determines retry out.

When abnormality has occurred in the retransmission process (Yes in step S210), the operation of the abnormality detection unit FDET proceeds to step S212. On the other hand, when abnormality has not occurred in the retransmission process (No in step S210), the operation of the abnormality detection unit FDET returns to step S210. That is, when abnormality has not occurred in the retransmission process, the abnormality detection unit FDET continues the process of detecting abnormality in the retransmission process.

In step S212, the abnormality detection unit FDET outputs the retransmission error notification RERR indicating that abnormality has occurred in the retransmission process, to the link control unit LCLT. Thus, in step S310, the link control unit LCLT receives the retransmission error notification RERR.

In step S310, the degeneration instruction unit DCLT of the link control unit LCLT receives the retransmission error notification RERR from the abnormality detection unit FDET. Thus, the link control unit LCLT starts a lane degeneration process in a case where abnormality has occurred in the retransmission process.

In step S312, the failure determination unit BJG determines whether or not there is a physical lane PHL in which the number of BIP errors of data, which is transferred to the physical layer PHY from the information processing apparatus PDEV which is a communication destination, within a predetermined period of time (for example, 80 milliseconds) exceeds a threshold value (for example, 255). The link control unit LCLT measures the number of BIP errors within a predetermined period of time for each physical lane PHL by using the error counter ECT, for example, in parallel with the operation illustrated in FIG. 11. For example, the number of BIP errors of the physical lanes PHL within a predetermined period of time is calculated in step S202 of FIG. 10.

When there is a physical lane PHL in which the number of BIP errors exceeds a threshold value (Yes in step S312), the operation of the link control unit LCLT proceeds to step S314. That is, if there is a high possibility of a failure occurring in a lane that transmits data in a direction of its own physical layer PHY from the information processing apparatus PDEV which is a communication destination, the operation of the link control unit LCLT proceeds to step S314.

On the other hand, when there is no physical lane PHL in which the number of BIP errors exceeds a threshold value (No in step S312), the operation of the link control unit LCLT proceeds to step S316. That is, if there is a high possibility of a failure occurring in a lane that transmits data in a direction of the information processing apparatus PDEV which is a communication destination from its own physical layer PHY, the operation of the link control unit LCLT proceeds to step S316. The threshold value of step S312 may be a value which is the same as or different from the threshold value of step S204 of FIG. 10.

In step S314, the lane selection unit LSEL specifies a physical lane PHL having the largest number of BIP errors within a predetermined period of time as a degenerating lane. For example, the lane selection unit LSEL specifies a degenerating physical lane as a defective lane based on the number of BIP errors within a predetermined period of time (for example, for the past 80 milliseconds). In this case, the lane selection unit LSEL may specify a degenerating physical lane as a defective lane with a high level of accuracy, as compared with a case where a degenerating lane is specified based on only a BIP error immediately before abnormality is detected in the retransmission process. Hereinafter, specification accuracy at the time of specifying a degenerating physical lane as a defective lane is also referred to as the specification accuracy of a degenerating lane.

For example, in a method of specifying a degenerating lane based on only a BIP error immediately before abnormality is detected in the retransmission process, when abnormality is detected in the retransmission process immediately after a BIP error due to noise or the like is detected in lanes except for a defective lane, there is a concern that the specification accuracy of a degenerating lane may be reduced.

In this manner, when abnormality has occurred in a process related to retransmission, the lane selection unit LSEL specifies a degenerating lane PHL based on the number of BIP errors within a predetermined period of time. That is, when abnormality has occurred in a process related to retransmission, the lane selection unit LSEL specifies a degenerating lane PHL based on error information EINF for a predetermined period of time.

In step S316, there is a high possibility of a failure being present in a lane that transmits data in a direction of the information processing apparatus PDEV which is a communication destination from its own physical layer PHY, and thus the link control unit LCLT requests a lane degeneration process from the link control unit LCLT of the information processing apparatus PDEV which is a communication destination. For example, the degeneration information generation unit DGEN outputs degeneration information DINFS for requesting the specification of a degenerating lane and the execution of a lane degeneration process from the information processing apparatus PDEV which is a communication destination, to the frame generation unit FGEN.

Thus, the information processing apparatus PDEV which is a communication destination receives a degeneration request DLLP that includes the degeneration information DINFS indicating the specification of a degenerating lane and the request for a lane degeneration process, and thus specifies a degenerating lane and performs a lane degeneration process. In addition, the information processing apparatus PDEV which is a communication destination outputs the degeneration request DLLP that includes the degeneration information DINFS indicating a physical lane PHL used for data transfer, and the like, to the information processing apparatus PDEV (information processing apparatus PDEV having transmitted the degeneration request DLLP) which is a request source of a lane degeneration process. Thus, for example, the frame reception unit FREC receives a degeneration request DLLP which is a response to the degeneration request DLLP, from the information processing apparatus PDEV which is a communication destination.

In step S318, the degeneration instruction unit DCLT receives degeneration information DINFS (degeneration request) for requesting degeneration, as a result of the lane degeneration process which is requested from the information processing apparatus PDEV which is a communication destination in step S316. Thus, the lane selection unit LSEL may select a physical lane PHL to be used for data transfer, and the like.

In step S400, the link control unit LCLT performs lane degeneration and instructs the physical layer PHY to restart. For example, the lane selection unit LSEL selects a physical lane PHL used for data transfer to and from the information processing apparatus PDEV which is a communication destination, from physical lanes PHL except for the physical lane PHL (degenerating lane PHL) which is specified in step S314, and sets the selected physical lane PHL to be in an enable state. Alternatively, the lane selection unit LSEL selects a physical lane PHL to be used for data transfer based on the degeneration information DINFS received in step S318, and sets the selected physical lane PHL to be in an enable state.

For example, when the operation illustrated in FIG. 11 is performed after the lane degeneration, a physical lane PHL set to be in a disable state before performing the operation illustrated in FIG. 11 is not included in physical lanes PHL to be selected.

In addition, the degeneration instruction unit DCLT outputs a notification for instructing the physical layer PHY to restart, to the start instruction unit SCLT. Then, the start instruction unit SCLT instructs the physical layer PHY to restart, for example, in response to the restart instruction from the degeneration instruction unit DCLT.

When the degeneration information generation unit DGEN specifies a degenerating lane in its own link control unit LCLT (when the process of step S314 is performed), the degeneration information generation unit outputs degeneration information DINFS for requesting lane degeneration from the information processing apparatus PDEV which is a communication destination, to the frame generation unit FGEN. Thus, the information processing apparatus PDEV which is a communication destination receives a degeneration request DLLP including the degeneration information DINFS for requesting lane degeneration. As a result, the information processing apparatus PDEV which is a communication destination may select a physical lane PHL to be used for data transfer, and the like. In this manner, for example, when abnormality has occurred in a process related to retransmission, the lane selection unit LSEL selects a physical lane PHL to be used for data transfer to and from an external device, based on error information EINF for a predetermined period of time.

In the restart of the physical layer PHY which is performed by lane degeneration, the contents set in step S400 are relayed to the setting of the physical lane PHL in an enable state. In the restart of the physical layer PHY which is performed by lane degeneration, the lane degeneration is already performed, and thus the lane degeneration process before linking up the physical layer PHY which is illustrated in FIG. 7 is not performed.

As described above, in the operation illustrated in FIG. 11, the lane selection unit LSEL specifies a degenerating lane PHL based on error information EINF indicating that data, which is transferred to the physical layer PHY from the information processing apparatus PDEV which is a communication destination, has an error. Accordingly, the frame transfer circuit FTR may specify a degenerating lane after a link-up by referring to the error information EINF and the like in a case where abnormality is detected in the retransmission process even when a physical layer PHY that does not have a defective lane specification function is used.

The operation of the information processing apparatus PDEV after a link-up is not limited to the above-mentioned example. For example, the lane selection unit LSEL may specify a degenerating lane based on the number of BIP errors at a point in time, immediately before, or immediately after abnormality is detected in the retransmission process.

Figure 12:
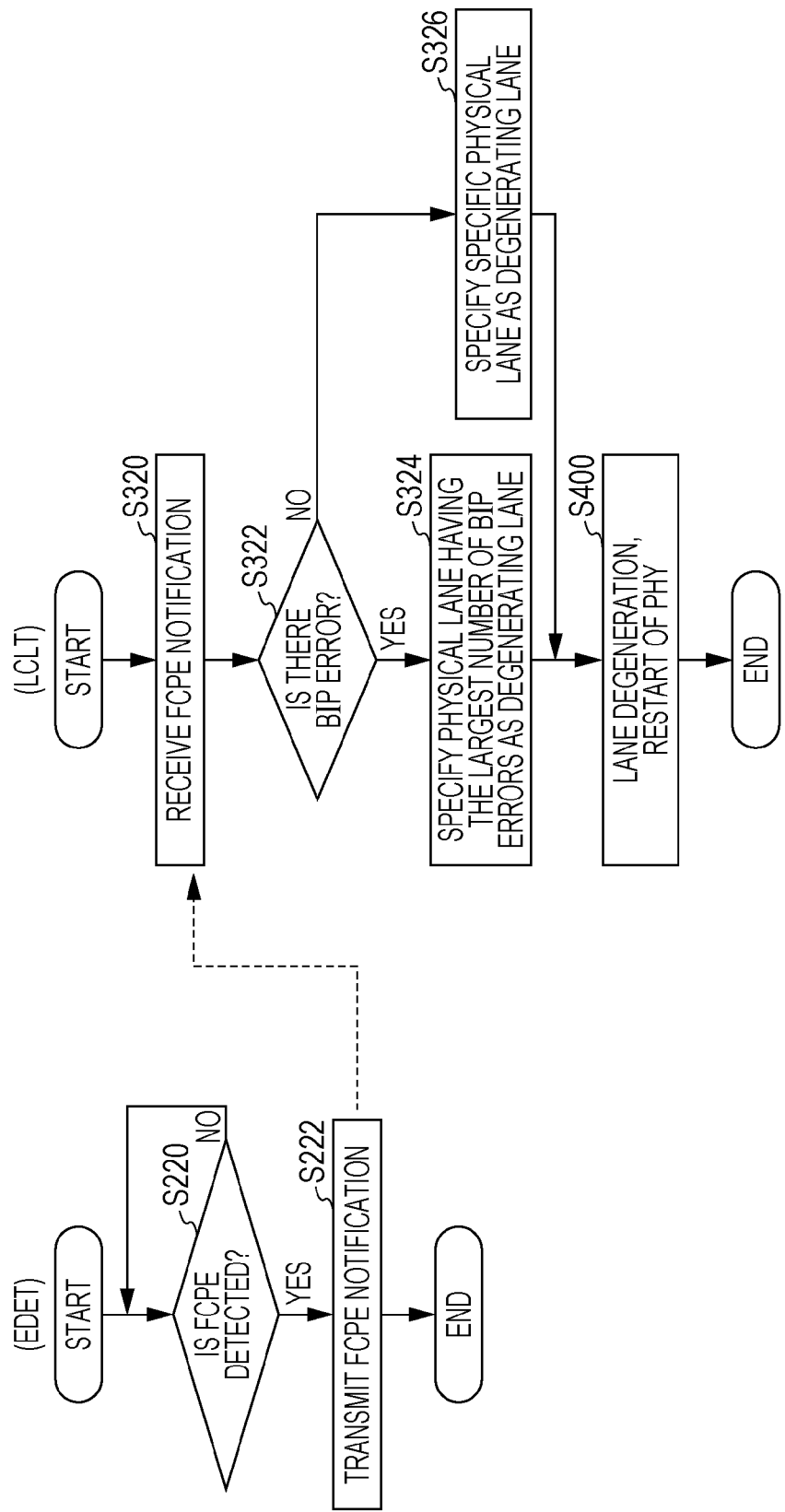
FIG. 12 is a diagram illustrating another example of an operation of the information processing apparatus illustrated in FIG. 1 after a link-up.

FIG. 12 illustrates another example of an operation of the information processing apparatus PDEV illustrated in FIG. 1 after a link-up. That is, FIG. 12 illustrates an embodiment of a method of controlling a parallel computer system. FIG.

12 illustrates an example of operations of the link control unit LCLT and the error detection unit EDET which are related to lane degeneration after linking up the physical layer PHY. For example, step S220 and step S222 correspond to a process of detecting a trigger of lane degeneration and are performed by the error detection unit EDET. In addition, step S320 to S326 and step S400 are performed by the link control unit LCLT.

In the operation illustrated in FIG. 12, for example, a trigger of lane degeneration is the detection of abnormality in flow control for transferring data to the information processing apparatus PDEV which is a communication destination (for example, the detection of a flow control protocol error which is illustrated in FIG. 6). The operation illustrated in FIG. 12 may be realized with hardware only or may be realized by controlling hardware by software. For example, software such as a control program may cause a computer to execute the operation illustrated in FIG. 12. That is, the computer may read a storage medium having a control program recorded thereon and execute the operation illustrated in FIG. 12.

In step S220, the error detection unit EDET determines whether or not an FCPE has been detected. For example, the error detection unit EDET performs a process of detecting abnormality (FCPE) in flow control for transferring data to the information processing apparatus PDEV which is a communication destination. For example, when the length of a period for which a flow control frame (flow control information FINF) has not been received exceeds a threshold value (for example, 200 microseconds), the error detection unit EDET determines an FCPE.

When an FCPE has been detected (Yes in step S220), the operation of the error detection unit EDET proceeds to step S222. On the other hand, when an FCPE has not been detected (No in step S220), the operation of the error detection unit EDET returns to step S220. That is, when abnormality has not occurred in flow control, the error detection unit EDET continues a process of detecting the abnormality in the flow control.

In step S222, the error detection unit EDET outputs a FCPE notification FERR indicating that the abnormality has occurred in the flow control, to the link control unit LCLT. Thus, in step S320, the link control unit LCLT receives the FCPE notification FERR.

In step S320, the degeneration instruction unit DCLT of the link control unit LCLT receives the FCPE notification FERR from the error detection unit EDET. Thus, the link control unit LCLT starts a lane degeneration process in a case where abnormality has occurred in the flow control.

In step S322, for example, the lane selection unit LSEL determines whether or not data, which is transferred to the physical layer PHY from the information processing apparatus PDEV which is a communication destination, has a BIP error. For example, the lane selection unit LSEL determines whether or not a BIP error is present based on error information EINF at a point in time, immediately before, or immediately after an FCPE is detected.

Here, for example, a time interval (for example, 4.5 microseconds) at which the FCPE is detected is shorter than a time interval (for example, 210 microseconds) at which the BIP error is detected. Therefore, when the FCPE is detected due to a fixed failure, there is a concern that a history of a BIP error (the number of BIP errors within a predetermined period of time) may not sufficiently reflect a situation until reaching the detection of the FCPE. Accordingly, when a degenerating lane is specified based on the history of the BIP error, there is a concern that the specification accuracy of the degenerating lane may be reduced. Thus, for example, the lane selection unit LSEL refers to the detection information (error information EINF) of the BIP error at a point in time, immediately before, or immediately after the FCPE is detected at the time of performing the processes of step S322 and step S324.

When a BIP error is present (Yes in step S322), the operation of the link control unit LCLT proceeds to step S324. On the other hand, when a BIP error is not present (No in step S322), the operation of the link control unit LCLT proceeds to step S326.

In step S324, the lane selection unit LSEL specifies a physical lane PHL having the largest number of BIP errors as a degenerating lane by referring to error information EINF at a point in time, immediately before, or immediately after the FCPE is detected. In this manner, when abnormality is detected in flow control, the lane selection unit LSEL specifies a degenerating lane PHL based on the error information EINF.

In step S326, the lane selection unit LSEL specifies a specific physical lane PHL as a degenerating lane. For example, the lane selection unit LSEL specifies a physical lane PHL which is determined in advance. Thus, lane degeneration is performed even when a BIP error is not detected, in spite of the detection of an FCPE.

In step S400, the lane selection unit LSEL performs lane degeneration so as not to use the physical lane PHL (degenerating lane PHL) which is specified in step S324 or step S326. For example, when step S324 is performed, the lane selection unit LSEL selects a physical lane PHL to be used for data transfer to and from the information processing apparatus PDEV which is a communication destination, from physical lanes PHL except for the physical lane PHL (degenerating lane PHL) which is specified in step S324. The lane selection unit LSEL sets the selected physical lane PHL to be in an enable state.

Alternatively, when step S326 is performed, the lane selection unit LSEL selects a physical lane PHL to be used for data transfer to and from the information processing apparatus PDEV which is a communication destination, from physical lanes PHL except for the physical lane PHL (degenerating lane PHL) which is specified in step S326. Then, the lane selection unit LSEL sets the selected physical lane PHL to be in an enable state.

For example, when the operation illustrated in FIG. 12 is performed after the lane degeneration, a physical lane PHL set to be in a disable state before performing the operation illustrated in FIG. 12 is not included in physical lanes PHL to be selected. In this case, for example, the physical lane PHL to be selected is a physical lane PHL except for the physical lane PHL (degenerating lane PHL) which is specified in step S324 or step S326 from physical lanes PHL set to be in an enable state before performing the operation illustrated in FIG. 12.

In addition, the degeneration instruction unit DCLT outputs a notification for instructing the physical layer PHY to restart, to the start instruction unit SCLT. Then, the start instruction unit SCLT instructs the physical layer PHY to restart, for example, in response to the restart instruction from the degeneration instruction unit DCLT.

In addition, the degeneration information generation unit DGEN outputs degeneration information DINFS for requesting lane degeneration from the information processing apparatus PDEV which is a communication destination, to the frame generation unit FGEN. Thus, the information processing apparatus PDEV which is a communication destination receives a degeneration request DLLP including the degeneration information DINFS for requesting lane degeneration. As a result, the information processing apparatus PDEV which is a communication destination may select a physical lane PHL to be used for data transfer, and the like. In this manner, for example, when abnormality is detected in flow control, the lane selection unit LSEL selects a physical lane PHL to be used for data transfer to and from an external device, based on the error information EINF.

In the restart of the physical layer PHY which is performed by lane degeneration, the contents set in step S400 are relayed to the setting of the physical lane PHL in an enable state. In the restart of the physical layer PHY which is performed by lane degeneration, the lane degeneration is already performed, and thus the lane degeneration process before linking up the physical layer PHY which is illustrated in FIG. 7 is not performed.

As described above, in the operation illustrated in FIG. 12, the lane selection unit LSEL specifies a degenerating lane PHL based on error information EINF indicating that data, which is transferred to the physical layer PHY from the information processing apparatus PDEV which is a communication destination, has an error. Accordingly, the frame transfer circuit FTR may specify a degenerating lane after a link-up by referring to the error information EINF and the like in a case where abnormality is detected in the flow control even when a physical layer PHY that does not have a defective lane specification function is used.

The operation of the information processing apparatus PDEV after a link-up is not limited to the above-mentioned example. For example, the process of step S326 may be omitted. In this case, for example, step S322 may be repeated until a BIP error is detected.

Figure 13:
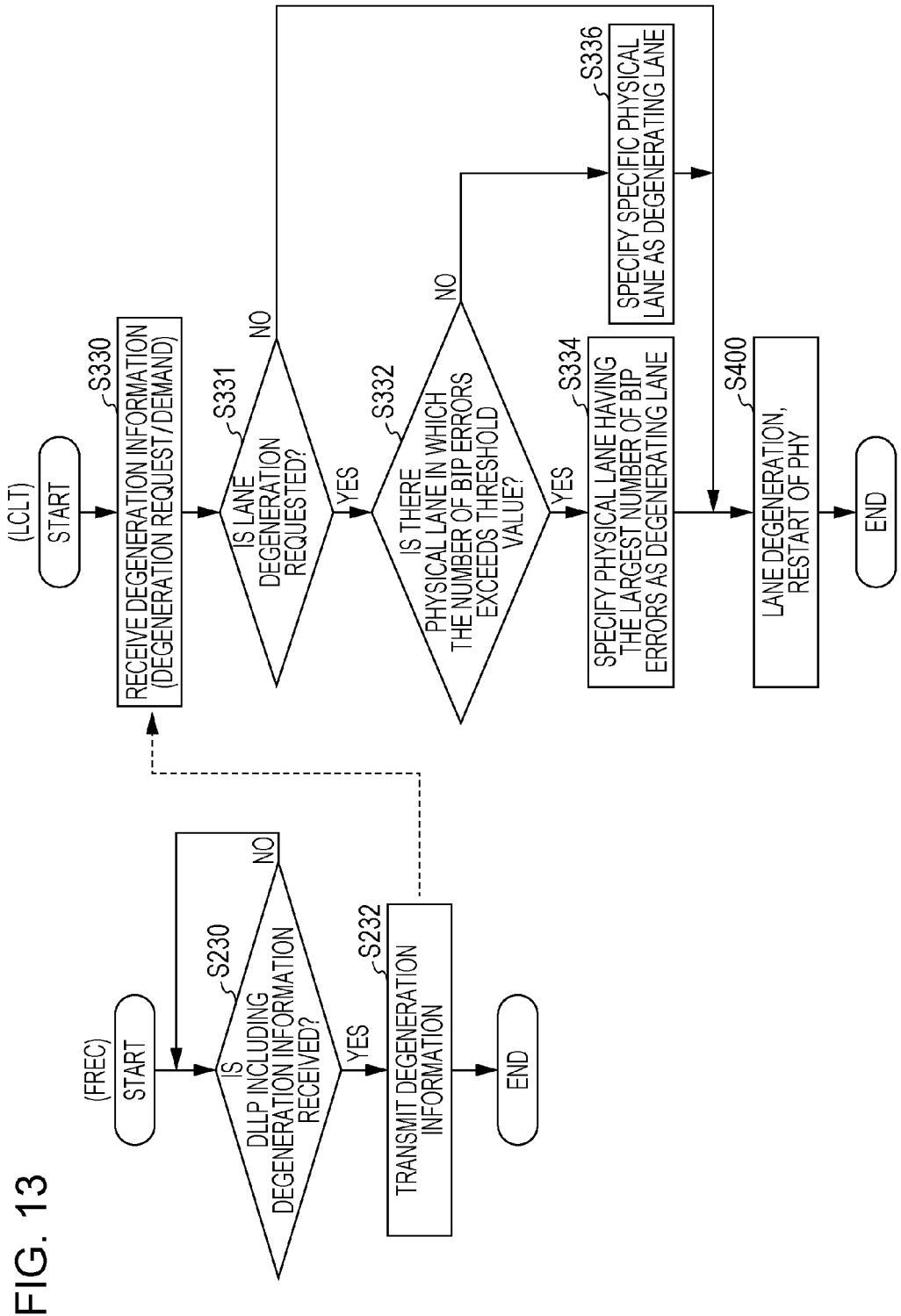
FIG. 13 is a diagram illustrating another example of an operation of the information processing apparatus illustrated in FIG. 1 after a link-up.

FIG. 13 illustrates another example of an operation of the information processing apparatus PDEV illustrated in FIG. 1 after a link-up. That is, FIG. 13 illustrates an embodiment of a method of controlling a parallel computer system. FIG. 13 illustrates an example of operations of the link control unit LCLT and the frame reception unit FREC which are related to lane degeneration when a trigger of lane degeneration is detected in the information processing apparatus PDEV which is a communication destination. For example, step S230 and step S232 correspond to a process of detecting a trigger of lane degeneration and are performed by the frame reception unit FREC. In addition, step S330 to step S336 and step S400 are performed by the link control unit LCLT.

The operation illustrated in FIG. 13 may be realized with hardware only or may be realized by controlling hardware by software. For example, software such as a control program may cause a computer to execute the operation illustrated in FIG. 13. That is, the computer may read a storage medium having a control program recorded thereon and execute the operation illustrated in FIG. 13.

In step S230, the frame reception unit FREC determines whether or not a control DLLP (degeneration request DLLP or degeneration request DLLP) which includes degeneration information DINFR has been received. When the control DLLP (degeneration request DLLP or degeneration request DLLP) which includes degeneration information DINFR has been received (Yes in step S230), the operation of the frame reception unit FREC proceeds to step S232. On the other hand, when the control DLLP (degeneration request DLLP or degeneration request DLLP) which includes degeneration information DINFR has not been received (No in step S230), the operation of the frame reception unit FREC returns to step S230.

In step S232, the frame reception unit FREC outputs the degeneration information DINFR included in the control DLLP (degeneration request DLLP or degeneration request DLLP) which is received in step S230, to the link control unit LCLT. Thus, in step S330, the link control unit LCLT receives the degeneration information DINFR.

In step S330, the degeneration instruction unit DCLT of the link control unit LCLT receives the degeneration information DINFR from the frame reception unit FREC. Thus, the link control unit LCLT starts a lane degeneration process in a case where a trigger of lane degeneration is detected in the information processing apparatus PDEV which is a communication destination.

In step S331, the degeneration instruction unit DCLT determines whether or not the degeneration information DINFR received in step S330 is a lane degeneration request. When the degeneration information DINFR is a lane degeneration request (Yes in step S331), the operation of the link control unit LCLT proceeds to step S332. On the other hand, when the degeneration information DINFR is not a lane degeneration request (No in step S331), the operation of the link control unit LCLT proceeds to step S400. That is, when the degeneration information DINFR is a lane degeneration request, the operation of the link control unit LCLT proceeds to step S400.

In step S332, the failure determination unit BJG determines whether or not there is a physical lane PHL in which the number of BIP errors of data, which is transferred to the physical layer PHY from the information processing apparatus PDEV which is a communication destination, within a predetermined period of time (for example, 80 milliseconds) exceeds a threshold value (for example, 255). The link control unit LCLT measures the number of BIP errors within a predetermined period of time for each physical lane PHL by using the error counter ECT, for example, in parallel with the operation illustrated in FIG. 13. For example, the number of BIP errors of the physical lanes PHL within a predetermined period of time is calculated in step S202 of FIG. 10.

When there is a physical lane PHL in which the number of BIP errors exceeds a threshold value (Yes in step S332), the operation of the link control unit LCLT proceeds to step S334. On the other hand, when there is no physical lane PHL in which the number of BIP errors exceeds a threshold value (No in step S332), the operation of the link control unit LCLT proceeds to step S336. The threshold value of step S332 may be a value which is the same as or different from the threshold value of step S204 of FIG. 10.

In step S334, the lane selection unit LSEL specifies a physical lane PHL having the largest number of BIP errors within a predetermined period of time as a degenerating lane. In this manner, the lane selection unit LSEL specifies the degenerating lane PHL based on the number of BIP errors within a predetermined period of time.

In step S336, the lane selection unit LSEL specifies a specific physical lane PHL as a degenerating lane. For example, the lane selection unit LSEL specifies a physical lane PHL which is determined in advance. Thus, the link control unit LCLT may perform lane degeneration even when a BIP error is not detected, in spite of the reception of the degeneration information DINFR indicating a lane degeneration request. When the number of BIP errors within a predetermined period of time is equal to or greater than 1 and equal to or less than a threshold value, the lane selection unit LSEL may specify a physical lane PHL having the largest number of BIP errors within a predetermined period of time as a degenerating lane.

In step S400, the link control unit LCLT performs lane degeneration and instructs the physical layer PHY to restart. For example, the lane selection unit LSEL selects a physical lane PHL to be used for data transfer to and from the information processing apparatus PDEV which is a communication destination, from physical lanes PHL except for the physical lane PHL (degenerating lane PHL) which is specified in step S334 or step S336. Then, the lane selection unit LSEL sets the selected physical lane PHL to be in an enable state.

Alternatively, when the degeneration information DINFR received in step S330 is a lane degeneration request, the lane selection unit LSEL selects a physical lane PHL to be used for data transfer, based on the degeneration information DINFS received in step S330. Then, the lane selection unit LSEL sets the selected physical lane PHL to be in an enable state.

For example, when the operation illustrated in FIG. 13 is performed after lane degeneration, a physical lane PHL set to be in a disable state before performing the operation illustrated in FIG. 13 is not included in physical lanes PHL to be selected.

In addition, the degeneration instruction unit DCLT outputs a notification for instructing the physical layer PHY to restart, to the start instruction unit SCLT. Then, the start instruction unit SCLT instructs the physical layer PHY to restart, for example, in response to the restart instruction from the degeneration instruction unit DCLT.

When the degeneration information DINFR received in step S330 is a lane degeneration request, the degeneration information generation unit DGEN outputs degeneration information DINFS (degeneration information DINFS for requesting lane degeneration) which indicates a physical lane PHL to be used for data transfer, and the like, to the frame generation unit FGEN. Thus, the information processing apparatus PDEV which is a communication destination receives a degeneration request DLLP including the degeneration information DINFS for requesting lane degeneration. As a result, the information processing apparatus PDEV which is a communication destination may select a physical lane PHL to be used for data transfer, and the like.

In this manner, for example, when the lane selection unit LSEL is requested to degenerate a lane from the information processing apparatus PDEV which is a communication destination, the lane selection unit selects a physical lane PHL to be used for data transfer to and from the information processing apparatus PDEV which is a communication destination, based on error information EINF for a predetermined period of time.

In the restart of the physical layer PHY which is performed by lane degeneration, the contents set in step S400 are relayed to the setting of the physical lane PHL in an enable state. In the restart of the physical layer PHY which is performed by lane degeneration, the lane degeneration is already performed, and thus the lane degeneration process before linking up the physical layer PHY which is illustrated in FIG. 7 is not performed. The operation of the information processing apparatus PDEV after a link-up is not limited to the above-mentioned example. In addition, the operation related to lane degeneration before a link-up in a case where a trigger of lane degeneration is detected in the information processing apparatus PDEV which is a communication destination is the same as the operation illustrated in FIG. 13.

As illustrated in FIGS. 10 to 13, the lane selection unit LSEL determines a degenerating lane PHL based on error information EINF indicating that data, which is transferred to the physical layer PHY from the information processing apparatus PDEV which is a communication destination, has an error. Accordingly, the frame transfer circuit FTR may specify a degenerating lane after a link-up by referring to the error information EINF and the like in a case where a trigger of lane degeneration is detected even when a physical layer PHY that does not have a defective lane specification function is used.

For example, the frame transfer circuit FTR performs processes of detecting a trigger of lane degeneration, such as step S200 to step S204 of FIG. 10, step S210 to step S212 of FIG. 11, step S220 to step S222 of FIG. 12, and step S230 to step S232 of FIG. 13, in parallel. In this case, the frame transfer circuit FTR specifies a degenerating lane PHL when one of a plurality of triggers of lane degeneration is detected, and thus it is possible to efficiently specify the degenerating lane PHL.

The frame transfer circuit FTR may perform some of the processes of detecting a trigger of lane degeneration which are illustrated in FIGS. 10 to 13. For example, the frame transfer circuit FTR may exclude the number of BIP errors within a predetermined period of time which exceeds a threshold value which is illustrated in FIG. 6, from a trigger of lane degeneration. In this case, for example, among the operations illustrated in FIGS. 10 to 13, step S204, step S300, and step S400 of FIG. 10 are omitted.

In addition, for example, when the detection of the deterioration in a bit error, the detection of retry out, and the number of BIP errors within a predetermined period of time which exceeds a threshold value, which are illustrated in FIG. 6, are excluded from a trigger of lane degeneration, the frame transfer circuit FTR may not perform the operations illustrated in FIGS. 10, 11, and 13. In this case, the error counter ECT and the failure determination unit BJG which are illustrated in FIG. 4 may be excluded from the selection unit SEL.

As described above, as illustrated in FIGS. 1 to 13, in the information processing apparatus, the parallel computer system, and the method of controlling a parallel computer system, a physical lane PHL to be degenerated (degenerating lane PHL) is specified based on one of the error information EINF and the AM detection information AINF.

For example, the AM detection information reception unit AREC receives AM detection information AINF, indicating that the physical layer PHY has received data from the information processing apparatus PDEV which is a communication destination, for each PCS lane PL. When the selection unit SEL detects the occurrence of a failure in a physical lane PHL and the like before a link-up, the selection unit specifies a degenerating lane PHL based on the AM detection information AINF. Thus, the frame transfer circuit FTR may specify a degenerating lane before a link-up by referring to the AM detection information AINF and the like even when a physical layer PHY that does not have a defective lane specification function is used.

In addition, for example, the error information reception unit EREC receives error information EINF, indicating that data transferred to the physical layer PHY from the information processing apparatus PDEV has an error, for each PCS lane PL. When the selection unit SEL detects the occurrence of a failure in the physical lane PHL and the like after a link-up, the selection unit specifies a degenerating lane PHL based on the error information EINF. Thus, the frame transfer circuit FTR may specify a degenerating lane after a link-up by referring to the error information EINF and the like even when a physical layer PHY that does not have a defective lane specification function is used.

As described above, in this embodiment, the frame transfer circuit FTR on which a layer higher than a physical layer is mounted specifies the degenerating lane PHL based on one of the error information EINF and the AM detection information AINF. Accordingly, in this embodiment, it is possible to specify a degenerating lane PHL even when the physical layer PHY that does not have a defective lane specification function is used. For example, in this embodiment, a function of outputting the error information EINF, the AM detection information AINF, and the like is added to the physical layer PHY that does not have a defective lane specification function. Thus, in this embodiment, it is possible to degenerate a defective lane PHL by setting the specified physical lane PHL (degenerating lane PHL) so as not to be used even when the physical layer PHY that does not have a defective lane specification function is used. As a result, in this embodiment, the connection of a link may be maintained by degenerating a defective lane PHL, and thus it is possible to improve the reliability of the parallel computer system.

Additional Notes

Note 1. An information processing apparatus, comprising: a physical layer device configured to distribute data to a plurality of first lanes and to perform data transfer to and from an external device by using a plurality of second lanes each of which has a number of the first lanes; and a transfer circuit configured to transfer data output by a central processing unit performing arithmetic processing to the physical layer device and to transfer the data which is received from the physical layer device and which is received by the central processing unit, the transfer circuit that comprises: an information acquisition unit configured to receive one of detection information of the first lanes which indicates that the physical layer device has received data from the external device and error information of the first lanes which indicates that the data transferred to the physical layer device from the external device has an error, from the physical layer device, and a selection unit configured to specify the second lane to be degenerated based on one of the error information and the detection information when a failure occurs in one of the plurality of first lanes and the plurality of second lanes, and selects the second lane to be used for data transfer to and from the external device, from the second lanes except for the specified second lane.

Note 2. The information processing apparatus according to note 1, wherein the selection unit includes a measurement unit that measures the number of errors occurring over a predetermined period of time for each of the second lanes based on the error information, and specifies the second lane to be degenerated based on the number of errors within the predetermined period of time when a failure occurs in one of the plurality of first lanes and the plurality of second lanes.

Note 3. The information processing apparatus according to note 2, wherein the transfer circuit includes a first detection unit that detects abnormality in a process related to retransmission of the data transferred to the external device through the physical layer device, and wherein the selection unit specifies the second lane to be degenerated based on the number of errors within the predetermined period of time when abnormality is detected in the process related to retransmission.

Note 4. The information processing apparatus according to note 2 or 3, wherein when the second lane in which the number of errors within the predetermined period of time exceeds a threshold value is detected, the selection unit specifies the second lane in which the number of errors within the predetermined period of time exceeds the threshold value, as the second lane to be degenerated.

Note 5. The information processing apparatus according to one of notes 1 to 4, wherein the transfer circuit includes a second detection unit that detects abnormality in flow control for transferring data to the external device through the physical layer device, and wherein the selection unit specifies the second lane to be degenerated based on the error information when abnormality is detected in the flow control.

Note 6. The information processing apparatus according to one of notes 1 to 5, wherein when the transfer circuit does not receive a notification of start completion before a predetermined period of time elapses after the information acquisition unit receives the detection information of one of the first lanes during a period until the transfer circuit receives the notification of start completion from the physical layer device after instructing the physical layer device to start, the selection unit specifies the second lane to be degenerated based on the detection information.

Note 7. A parallel computer system including a plurality of information processing apparatuses connected to each other through transmission paths, the information processing apparatus comprising: a physical layer device configured to distribute data to a plurality of first lanes and to perform data transfer to and from the information processing apparatus which is a communication destination by using a plurality of second lanes each of which has a number of the first lanes; and a transfer circuit configured to transfer data output by a central processing unit performing arithmetic processing to the physical layer device and to transfer the data which is received from the physical layer device and which is received by the central processing unit, the transfer circuit that comprises: an information acquisition unit configured to receive one of detection information of the first lanes which indicates that the physical layer device has received data from the information processing apparatus which is a communication destination and error information of the first lanes which indicates that the data transferred to the physical layer device from the information processing apparatus which is a communication destination has an error, from the physical layer device, and a selection unit configured to specify the second lane to be degenerated based on one of the error information and the detection information when a failure occurs in one of the plurality of first lanes and the plurality of second lanes, and selects the second lane to be used for data transfer to and from the information processing apparatus which is a communication destination, from the second lanes except for the specified second lane.

Note 8. The parallel computer system according to note 7, wherein the selection unit includes a measurement unit that measures the number of errors occurring over a predetermined period of time for each of the second lanes based on the error information, and specifies the second lane to be degenerated based on the number of errors within the predetermined period of time when a failure occurs in one of the plurality of first lanes and the plurality of second lanes.

Note 9. The parallel computer system according to note 8, wherein the transfer circuit includes a first detection unit that detects abnormality in a process related to retransmission of the data transferred to the information processing apparatus which is a communication destination through the physical layer device, and wherein the selection unit specifies the second lane to be degenerated based on the number of errors within the predetermined period of time when abnormality is detected in the process related to retransmission.

Note 10. The parallel computer system according to note 8 or 9, wherein when the second lane in which the number of errors within the predetermined period of time exceeds a threshold value is detected, the selection unit specifies the second lane in which the number of errors within the predetermined period of time exceeds the threshold value, as the second lane to be degenerated.

Note 11. The parallel computer system according to one of notes 7 to 10, wherein the transfer circuit includes a second detection unit that detects abnormality in flow control for transferring data to the information processing apparatus which is a communication destination through the physical layer device, and wherein the selection unit specifies the second lane to be degenerated based on the error information when abnormality is detected in the flow control.

Note 12. The parallel computer system according to one of notes 7 to 11, wherein when the transfer circuit does not receive a notification of start completion before a predetermined period of time elapses after the information acquisition unit receives the detection information of one of the first lanes during a period until the transfer circuit receives the notification of start completion from the physical layer device after instructing the physical layer device to start, the selection unit specifies the second lane to be degenerated based on the detection information.

Note 13. A method of controlling a parallel computer system including a plurality of information processing apparatuses connected to each other through transmission paths, the information processing apparatus including a physical layer device configured to distribute data to a plurality of first lanes and to perform data transfer to and from the information processing apparatus which is a communication destination by using a plurality of second lanes each of which has a number of the first lanes, and a transfer circuit configured to transfer data output by a central processing unit performing arithmetic processing to the physical layer device and transfers the data which is received from the physical layer device and which is received by the central processing unit, the method comprising: causing the transfer circuit to receive one of detection information of the first lanes which indicates that the physical layer device has received data from the information processing apparatus which is a communication destination and error information of the first lanes which indicates that the data transferred to the physical layer device from the information processing apparatus which is a communication destination has an error, from the physical layer device, and causing the transfer circuit to specify the second lane to be degenerated based on one of the error information and the detection information when a failure occurs in one of the plurality of first lanes and the plurality of second lanes, and to select the second lane to be used for data transfer to and from the information processing apparatus which is a communication destination, from the second lanes except for the specified second lane.

Note 14. The method according to note 13, wherein the transfer circuit measures the number of errors occurring over a predetermined period of time for each of the second lanes based on the error information, and specifies the second lane to be degenerated based on the number of errors within the predetermined period of time when a failure occurs in one of the plurality of first lanes and the plurality of second lanes.

Note 15. The method according to note 14, wherein the transfer circuit performs a process of detecting abnormality in a process related to retransmission of the data transferred to the information processing apparatus which is a communication destination through the physical layer device, and wherein the transfer circuit specifies the second lane to be degenerated based on the number of errors within the predetermined period of time when abnormality is detected in the process related to retransmission.

Note 16. The method according to note 14 or 15, wherein when the second lane in which the number of errors within the predetermined period of time exceeds a threshold value is detected, the transfer circuit specifies the second lane in which the number of errors within the predetermined period of time exceeds the threshold value, as the second lane to be degenerated.

Note 17. The method according to one of notes 13 to 16, wherein the transfer circuit performs a process of detecting abnormality in flow control for transferring data to the information processing apparatus which is a communication destination through the physical layer device, and wherein the transfer circuit specifies the second lane to be degenerated based on the error information when abnormality is detected in the flow control.

Note 18. The method according to one of notes 13 to 17, wherein when the transfer circuit does not receive a notification of start completion before a predetermined period of time elapses after receiving the detection information of one of the first lanes during a period until the notification of start completion is received from the physical layer device after instructing the physical layer device to start, the transfer circuit specifies the second lane to be degenerated based on the detection information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
an Ethernet physical layer configured to distribute data to a plurality of first lanes and to perform data transfer to and from an external device by using a plurality of second lanes each of which has a number of the plurality of first lanes; and
a transfer circuit configured to transfer data output by a central processing unit performing arithmetic processing to the Ethernet physical layer and to transfer the data which is received from the Ethernet physical layer and which is received by the central processing unit, the transfer circuit comprising:
  a first detection circuit that detects an abnormality in flow control of data transferred to the external device through the Ethernet physical layer;
  an information acquisition circuit configured to receive one of detection information of the first lanes which indicates that the Ethernet physical layer has received data from the external device and error information of the plurality of first lanes which indicates that the data transferred to the Ethernet physical layer from the external device has an error, from the Ethernet physical layer, and
  a selection circuit configured to specify the second lane to be degenerated based on one of the error information and the detection information when a failure occurs in one of the plurality of first lanes and the plurality of second lanes, and selects the second lane to be used for data transfer to and from the external device, from the second lanes except for the specified second lane, the selection circuit specifying the second lane to be degenerated based on the error information when the abnormality is detected in the flow control.

2. The information processing apparatus according to claim 1, wherein the selection circuit includes a measurement unit that measures the number of errors occurring over a predetermined period of time for each of the second lanes based on the error information, and specifies the second lane to be degenerated based on the number of errors within the predetermined period of time when a failure occurs in one of the plurality of first lanes and the plurality of second lanes.

3. The information processing apparatus according to claim 2,
wherein the transfer circuit includes a second detection circuit that detects abnormality in a process related to retransmission of the data transferred to the external device through the Ethernet physical layer, and
wherein the selection circuit specifies the second lane to be degenerated based on the number of errors within the predetermined period of time when abnormality is detected in the process related to retransmission.

4. The information processing apparatus according to claim 2, wherein when the second lane in which the number of errors within the predetermined period of time exceeds a threshold value is detected, the selection circuit specifies the second lane in which the number of errors within the predetermined period of time exceeds the threshold value, as the second lane to be degenerated.

5. The information processing apparatus according to claim 1, wherein when the transfer circuit does not receive a notification of start completion before a predetermined period of time elapses after the information acquisition circuit receives the detection information of one of the first lanes during a period until the transfer circuit receives the notification of start completion from the Ethernet physical layer after instructing the Ethernet physical layer to start, the selection circuit specifies the second lane to be degenerated based on the detection information.

6. A parallel computer system including a plurality of information processing apparatuses connected to each other through transmission paths, the information processing apparatus comprising:
an Ethernet physical layer configured to distribute data to a plurality of first lanes and to perform data transfer to and from the information processing apparatus which is a communication destination by using a plurality of second lanes each of which has a number of the plurality of first lanes; and
a transfer circuit configured to transfer data output by a central processing unit performing arithmetic processing to the Ethernet physical layer and to transfer the data which is received from the Ethernet physical layer and which is received by the central processing unit, the transfer circuit comprising:
a first detection circuit that detects an abnormality in flow control of data transferred to the information processing apparatus through the Ethernet physical layer;
an information acquisition circuit configured to receive one of detection information of the first lanes which indicates that the Ethernet physical layer has received data from the information processing apparatus which is a communication destination and error information of the plurality of first lanes which indicates that the data transferred to the Ethernet physical layer from the information processing apparatus which is a communication destination has an error, from the Ethernet physical layer, and
a selection circuit configured to specify the second lane to be degenerated based on one of the error information and the detection information when a failure occurs in one of the plurality of first lanes and the plurality of second lanes, and selects the second lane to be used for data transfer to and from the information processing apparatus which is a communication destination, from the second lanes except for the specified second lane, the selection circuit specifying the second lane to be degenerated based on the error information when the abnormality is detected in the flow control.

7. The parallel computer system according to claim 6, wherein the selection circuit includes a measurement unit that measures the number of errors occurring over a predetermined period of time for each of the second lanes based on the error information, and specifies the second lane to be degenerated based on the number of errors within the predetermined period of time when a failure occurs in one of the plurality of first lanes and the plurality of second lanes.

8. The parallel computer system according to claim 7,
wherein the transfer circuit includes a second detection circuit that detects abnormality in a process related to retransmission of the data transferred to the information processing apparatus which is a communication destination through the Ethernet physical layer, and
wherein the selection circuit specifies the second lane to be degenerated based on the number of errors within the predetermined period of time when abnormality is detected in the process related to retransmission.

9. The parallel computer system according to claim 7, wherein when the second lane in which the number of errors within the predetermined period of time exceeds a threshold value is detected, the selection circuit specifies the second lane in which the number of errors within the predetermined period of time exceeds the threshold value, as the second lane to be degenerated.

10. The parallel computer system according to claim 6, wherein when the transfer circuit does not receive a notification of start completion before a predetermined period of time elapses after the information acquisition circuit receives the detection information of one of the first lanes during a period until the transfer circuit receives the notification of start completion from the Ethernet physical layer after instructing the Ethernet physical layer to start, the selection circuit specifies the second lane to be degenerated based on the detection information.

11. A method of controlling a parallel computer system including a plurality of information processing apparatuses connected to each other through transmission paths, the information processing apparatus including a Ethernet physical layer configured to distribute data to a plurality of first lanes and to perform data transfer to and from the information processing apparatus which is a communication destination by using a plurality of second lanes each of which has a number of the plurality of first lanes, and a transfer circuit configured to transfer data output by a central processing unit performing arithmetic processing to the Ethernet physical layer and transfers the data which is received from the Ethernet physical layer and which is received by the central processing unit, the method comprising:

causing the transfer circuit to receive one of detection information of the first lanes which indicates that the Ethernet physical layer has received data from the information processing apparatus which is a communication destination and error information of the first lanes which indicates that the data transferred to the Ethernet physical layer from the information processing apparatus which is a communication destination has an error, from the Ethernet physical layer, and causing the transfer circuit to specify the second lane to be degenerated based on one of the error information and the detection information when a failure occurs in one of the plurality of first lanes and the plurality of second lanes, and to select the second lane to be used for data transfer to and from the information processing apparatus which is a communication destination, from the second lanes except for the specified second lane, wherein the transfer circuit performs a process of detecting an abnormality in flow control of data transferred to the information processing apparatus through the Ethernet physical layer, and the transfer circuit specifies the second lane to be degenerated based on the error information when the abnormality is detected in the flow control.

12. The method according to claim 11, wherein the transfer circuit measures the number of errors occurring over a predetermined period of time for each of the second lanes based on the error information, and specifies the second lane to be degenerated based on the number of errors within the predetermined period of time when a failure occurs in one of the plurality of first lanes and the plurality of second lanes.

13. The method according to claim 12, wherein the transfer circuit performs a process of detecting abnormality in a process related to retransmission of the data transferred to the information processing apparatus which is a communication destination through the Ethernet physical layer, and wherein the transfer circuit specifies the second lane to be degenerated based on the number of errors within the predetermined period of time when abnormality is detected in the process related to retransmission.

14. The method according to claim 12, wherein when the second lane in which the number of errors within the predetermined period of time exceeds a threshold value is detected, the transfer circuit specifies the second lane in which the number of errors within the predetermined period of time exceeds the threshold value, as the second lane to be degenerated.

15. The method according to claim 11, wherein when the transfer circuit does not receive a notification of start completion before a predetermined period of time elapses after receiving the detection information of one of the first lanes during a period until the notification of start completion is received from the Ethernet physical layer after instructing the physical layer device to start, the transfer circuit specifies the second lane to be degenerated based on the detection information.

* * * * *